United States Patent
Tochimoto et al.

(10) Patent No.: US 6,612,824 B2
(45) Date of Patent: *Sep. 2, 2003

(54) THREE-DIMENSIONAL OBJECT MOLDING APPARATUS

(75) Inventors: Shigeaki Tochimoto, Takatsuki (JP); Fumiya Yagi, Toyonaka (JP); Norihiro Agawa, Itami (JP); Hisashi Takata, Nishinomiya (JP); Toshio Norita, Osaka (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/536,299

(22) Filed: Mar. 27, 2000

(65) Prior Publication Data
US 2002/0167101 A1 Nov. 14, 2002

(30) Foreign Application Priority Data

Mar. 29, 1999 (JP) .......................... P11-086909
Mar. 29, 1999 (JP) .......................... P11-086911
Mar. 29, 1999 (JP) .......................... P11-086912

(51) Int. Cl.[7] .............................................. B29C 31/08
(52) U.S. Cl. ...................................... 425/130; 425/375
(58) Field of Search ................................. 425/130, 174, 425/174.4, 375; 264/246, 401, 496

(56) References Cited

U.S. PATENT DOCUMENTS

| 5,059,266 A | * 10/1991 | Yamane et al. ............... 156/64 |
| 5,136,515 A | * 8/1992 | Helinski ..................... 364/468 |
| 5,149,548 A | * 9/1992 | Yamane et al. .......... 425/174.4 |
| 5,260,009 A | * 11/1993 | Penn .......................... 264/40.1 |
| 5,633,021 A | * 5/1997 | Brown et al. ............... 425/375 |
| 6,007,318 A | 12/1999 | Russell et al. .............. 425/130 |
| 6,164,850 A | * 12/2000 | Speakman ............. 400/120.09 |

FOREIGN PATENT DOCUMENTS

| JP | 7-88967 | 4/1995 |
| JP | 9-324203 | 12/1997 |
| JP | 10-207194 | 8/1998 |
| WO | 96/23647 | 8/1996 |

* cited by examiner

Primary Examiner—James P. Mackey
Assistant Examiner—Joseph S Del Sole
(74) Attorney, Agent, or Firm—McDermott, Will & Emery

(57) ABSTRACT

A 3D object molding apparatus has a tank holding an uncolored or white resin as a first material for use in molding an interior of a 3D molded object and other thanks holding colored resins as second materials for use in molding a surface of the 3D molded object. A control unit moves a nozzle head in the XY plane and controls jetting of resins from injection nozzles of the nozzle head. When molding an interior of the 3D molded product, at least the first material is jetted and when molding a surface of the product, at least the second material is jetted. The apparatus has coloring nozzles to jet predetermined coloring agents in molding the 3D molded product to achieve coloring of the 3D molded product in the molding process.

10 Claims, 22 Drawing Sheets

F/G. 5
LIGHT ←————————→ DARK
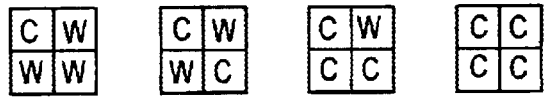
C : CYAN
W : WHITE
F/G. 6
LIGHT C ←————————————————→ LIGHT Y
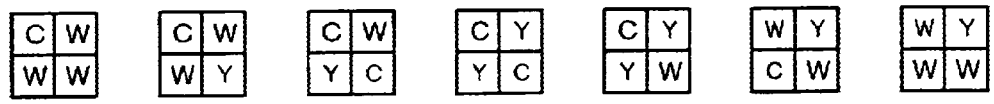
C : CYAN
Y : YELLOW
W : WHITE

FIG. 8A

| C | W |
|---|---|
| W | W |

| W | W |
|---|---|
| C | W |

| W | W |
|---|---|
| W | C |

| W | C |
|---|---|
| W | W |

FIG. 8B

| C | C |
|---|---|
| W | W |

| C | W |
|---|---|
| W | C |

| C | W |
|---|---|
| C | W |

| W | C |
|---|---|
| C | W |

| W | W |
|---|---|
| C | C |

| W | C |
|---|---|
| W | C |

FIG. 8C

| W | C |
|---|---|
| C | C |

| C | C |
|---|---|
| W | C |

| C | C |
|---|---|
| C | W |

| C | W |
|---|---|
| C | C |

FIG. 9A

| | | | | | | | |
|---|---|---|---|---|---|---|---|
| 15e — | S | S | S | S | S | S | S |
| 15c — | C | C | C | C | C | C | C |
| 15b — | M | M | M | M | M | M | M |
| 15a — | Y | Y | Y | Y | Y | Y | Y |
| 15d — | W | W | W | W | W | W | W |

| | | | | | | | |
|---|---|---|---|---|---|---|---|
| 15e — | S | S | S | S | S | S | S |
| 15f — | K | K | K | K | K | K | K |
| 15c — | C | C | C | C | C | C | C |
| 15b — | M | M | M | M | M | M | M |
| 15a — | Y | Y | Y | Y | Y | Y | Y |
| 15d — | W | W | W | W | W | W | W |

17, 15

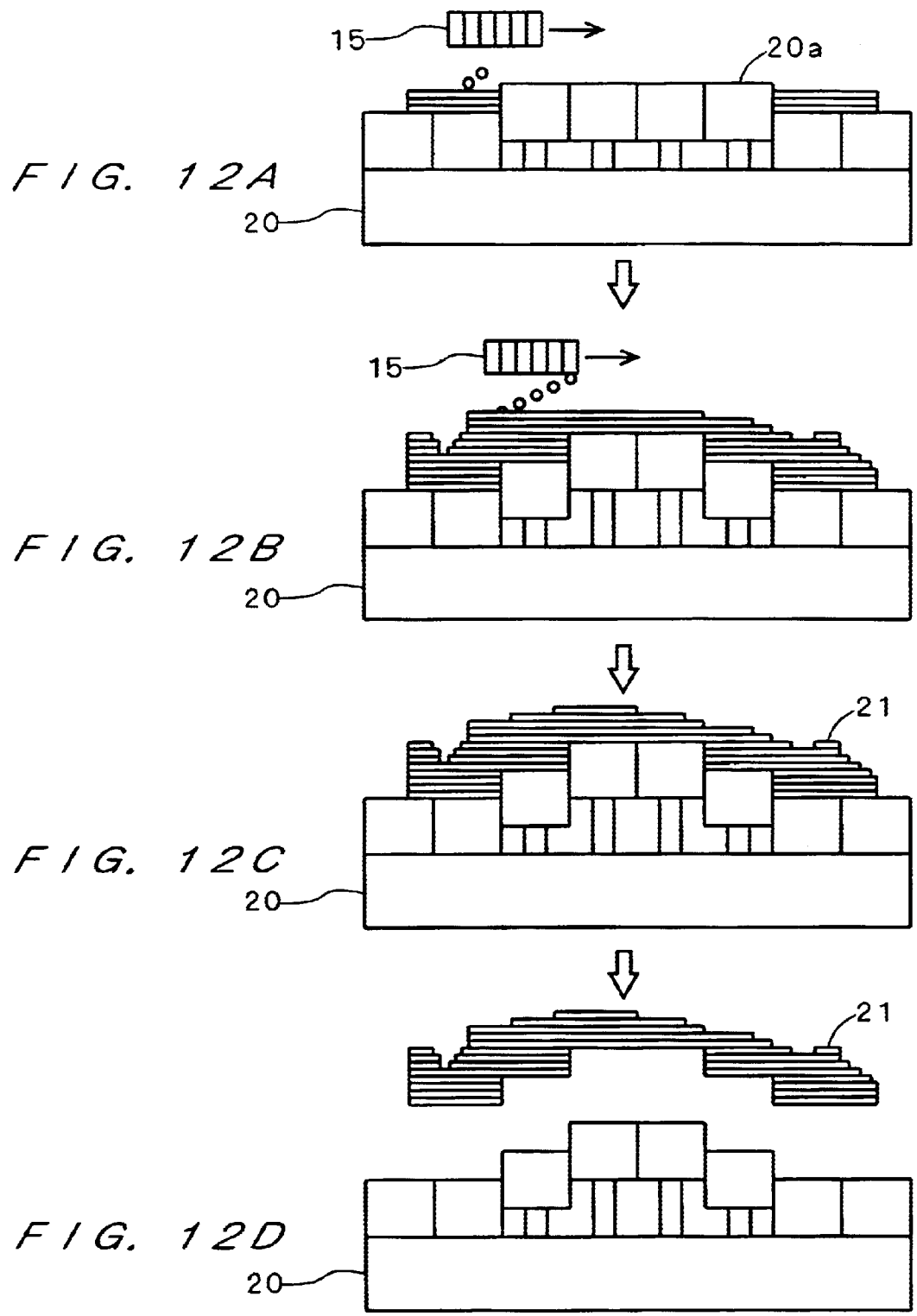

FIG. 18A

|  | 37 | | 37 | | | | | | | | | | | |
|---|---|---|---|---|---|---|---|---|---|---|---|---|---|---|
| 35a | Y | Y | Y | Y | Y | Y | Y | Y | Y | Y | Y | Y | Y | Y |
| 35b | M | M | M | M | M | M | M | M | M | M | M | M | M | M |
| 35c | C | C | C | C | C | C | C | C | C | C | C | C | C | C |
| 35d | W | W | W | W | W | W | W | W | W | W | W | W | W | W |
| 36b | Pb | | Pb | | Pb | | Pb | | Pb | | Pb | | Pb | |
| 36a | Pa | | Pa | | Pa | | Pa | | Pa | | Pa | | Pa | |

FIG. 18B

|  | 37 | | 37 | | | | | | | | | | | |
|---|---|---|---|---|---|---|---|---|---|---|---|---|---|---|
| 35e | K | K | K | K | K | K | K | K | K | K | K | K | K | |
| 35a | Y | Y | Y | Y | Y | Y | Y | Y | Y | Y | Y | Y | Y | |
| 35b | M | M | M | M | M | M | M | M | M | M | M | M | M | |
| 35c | C | C | C | C | C | C | C | C | C | C | C | C | C | |
| 35d | W | W | W | W | W | W | W | W | W | W | W | W | W | |
| 36b | Pb | | Pb | | Pb | | Pb | | Pb | | Pb | | Pb | |
| 36a | Pa | | Pa | | Pa | | Pa | | Pa | | Pa | | Pa | |

FIG. 18C

|  | 37 | | 37 | | | | | | | | | | | |
|---|---|---|---|---|---|---|---|---|---|---|---|---|---|---|
| 35e | K | K | K | K | K | K | K | K | K | K | K | K | K | |
| 35f | B | B | B | B | B | B | B | B | B | B | B | B | B | |
| 35g | G | G | G | G | G | G | G | G | G | G | G | G | G | |
| 35h | R | R | R | R | R | R | R | R | R | R | R | R | R | |
| 36c | P | | P | | P | | P | | P | | P | | P | |

F / G. 19A
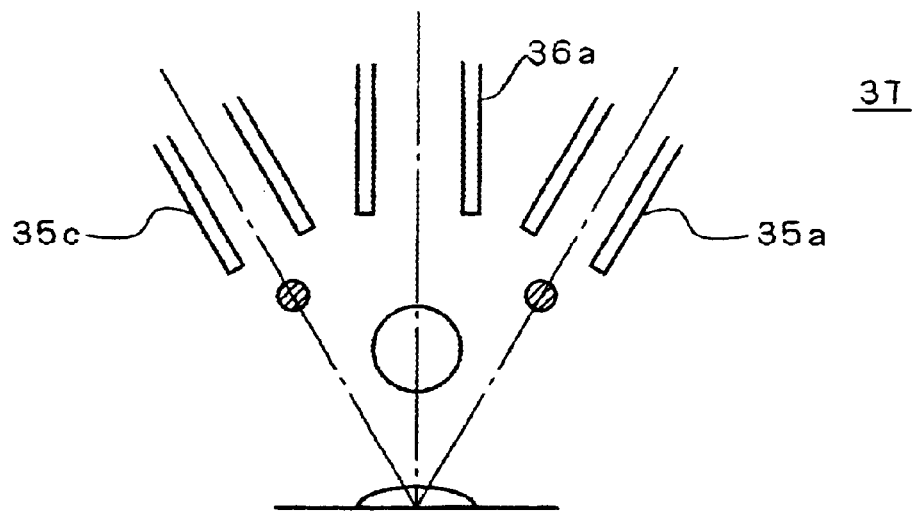
F / G. 19B
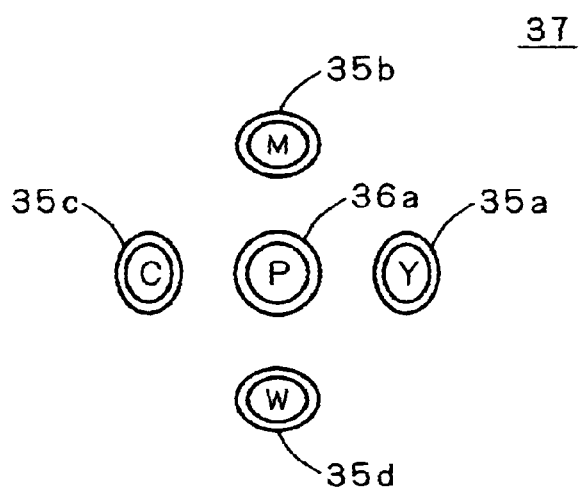

THREE-DIMENSIONAL OBJECT MOLDING APPARATUS

This application is based on application Nos. 11-86909, 11-86911, and 11-86912 filed in Japan, the contents of which are hereby incorporated by reference.

BACKGROUND OF THE INVENTION

1. Field of the Invention

The present invention relates to a three-dimensional (3D) object molding apparatus and method especially for manufacturing an intended 3D molded product by jetting materials such as resins in a fluid or liquid state for example in an ink jet system and curing and laminating them in layers.

2. Description of the Background Art

Conventionally, there have been apparatuses that perform 3D molding of a 3D object by cutting the object at a plurality of parallel planes and successively laminating resins in layers for each cross-section, thereby to produce a molded product or 3D model of the object.

FIG. 23 is a schematic diagram of a conventional 3D object molding apparatus 100. In the apparatus 100, a computer 111 converts a 3D object to be molded into a data format and outputs section data which is obtained by slicing the object into several layers of thin cross-sections. A drive control unit 112 receives the section data from the computer 111 and controls an ink jet head 115, an XY-directional driving unit 113, and a Z-directional driving unit 114 according to the data. Under the control of the drive control unit 112, the XY-directional driving unit 113 starts operating and the ink jet head 115 jets droplets of a thermoplastic resin. This forms a cross-sectional shape based on the section data from the computer 111. The thermoplastic resin jetted onto a stage 116 undergoes heat radiation and cooling, thereby changing its state from molten to solid (i.e., being cured). These operations produce a single cross-section, i.e., a single layer.

The drive control unit 112 then controls the Z-directional driving unit 114 so that the stage 116 is lowered by one layer thickness. In a similar manner, another layer can be stacked on the initially formed layer. Stacking such successive thin layers on top of each other result in a molded product 117.

When the molded product 117 has overhangs in shape, the computer 111 adds the shape of overhang supporting parts to the section data as necessary during conversion of the object to data format. According the shape of overhang supporting parts, the drive control unit 112 causes an ink jet head 118 to jet droplets of a thermoplastic resin having a different melting temperature from that forming the molded product, thereby to form overhang supporting parts 119 simultaneously with the formation of the molded product.

After the completion of lamination, the molded product undergoes heat curing at temperatures higher than the melting point of the resin forming the supporting parts and lower than the melting point of the resin forming the molded product. This allows only the resin forming the overhang supporting parts 119 to be melted and removed, thereby producing a desired 3D molded product.

However, the 3D molded product produced by the conventional 3D object molding apparatus or an injection molding/cutting machine is formed only of a single resin material except in special cases such as double molding, and is thus only of a single color. When coloring is required for the 3D molded product, a designer must draw patterns and apply colors at later stages. This consumes time and cost more than necessary.

That is, the production of a 3D molded product having a plurality of colors or any combination color must rely on manual operation after molding since it is not easy for the conventional apparatus to produce a finished 3D molded product for a short time at low cost.

Here it should be noted that coloring is mainly required for the surface of a 3D molded product and is not much of a problem for the interior as long as the surface is colored. Therefore, it is desirable to use different materials properly in the surface and interior molding of a 3D molded product. For that reason, the apparatus needs to be configured so that, in laminating each layer of the product, coloring materials are jetted to mold around the surface of a 3D molded product and another material prepared for interior use is jetted to mold the interior.

It is, however, impossible for the conventional 3D object molding apparatus 100 to have such a configuration.

SUMMARY OF THE INVENTION

The present invention is directed to a three-dimensional object molding apparatus for producing a three-dimensional molded product by jetting materials to form each layer and stacking such layers in succession.

According to an aspect of the present invention, this apparatus comprises a first nozzle jetting a first material, a second nozzle jetting a second material, and a controller which, in forming each layer of the three-dimensional molded product, causes the first nozzle to jet the first material in molding the interior of the layer and the second nozzle to jet the second material in molding a surface of the layer.

Thus, different materials can be used properly in the surface and interior molding of the three-dimensional molded product.

According to another aspect of the present invention, the second material includes a plurality of resins having different color components, and the second nozzle includes a plurality of nozzles corresponding to the resins.

Thus, it is easy to color the surface of the three-dimensional molded product in the molding process for a short time at low cost.

According to still another aspect of the present invention, the apparatus comprises a molding nozzle jetting a molding resin to produce a three-dimensional molded product, and coloring nozzles jetting coloring agents of a plurality of colors to color the product.

Thus, it is easy to color the three-dimensional molded product in the molding process for a short time at low cost.

According to still another aspect of the present invention, the apparatus comprises a first nozzle jetting a white material and a second nozzle jetting materials of a plurality of colors other than white.

This facilitates clear reproduction of the color intensity and gradations as well as allowing short-time low-cost coloring of the three-dimensional molded product.

The present invention is also directed to a three-dimensional object molding method of producing a three-dimensional molded product by jetting materials to form each layer and staking such layers in succession.

The present invention aims to provide an improved three-dimensional object molding apparatus and method that bring about solutions to the conventional problems.

A first object of the present invention is to facilitate short-time low-cost molding by using different materials properly in the surface and interior molding.

A second object of the present invention is to allow short-time low-cost coloring of a three-dimensional molded product.

A third object of the present invention is to facilitate clear reproduction of the color intensity and gradations on a three-dimensional molded product as well as allowing short-time low-cost coloring of the product.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows an example of gradations of cyan.

FIG. 6 shows an example of gradations in color between light cyan to light yellow.

FIGS. 8A to 8C show examples of variations in the injection pattern of colored resins, for example.

FIGS. 9A and 9B show examples of the structure of a nozzle head according to the first and second preferred embodiments.

FIGS. 12A to 12D show the operation of split stages.

FIGS. 18A to 18C show examples of the structure of a nozzle head according to the third and fourth preferred embodiments.

FIGS. 19A and 19B schematically show a configuration of a plurality of concentrically arranged injection nozzles according to the third and fourth preferred embodiments.

DESCRIPTION OF THE PREFERRED EMBODIMENTS

1. FIRST PREFERRED EMBODIMENT

Figure 1:
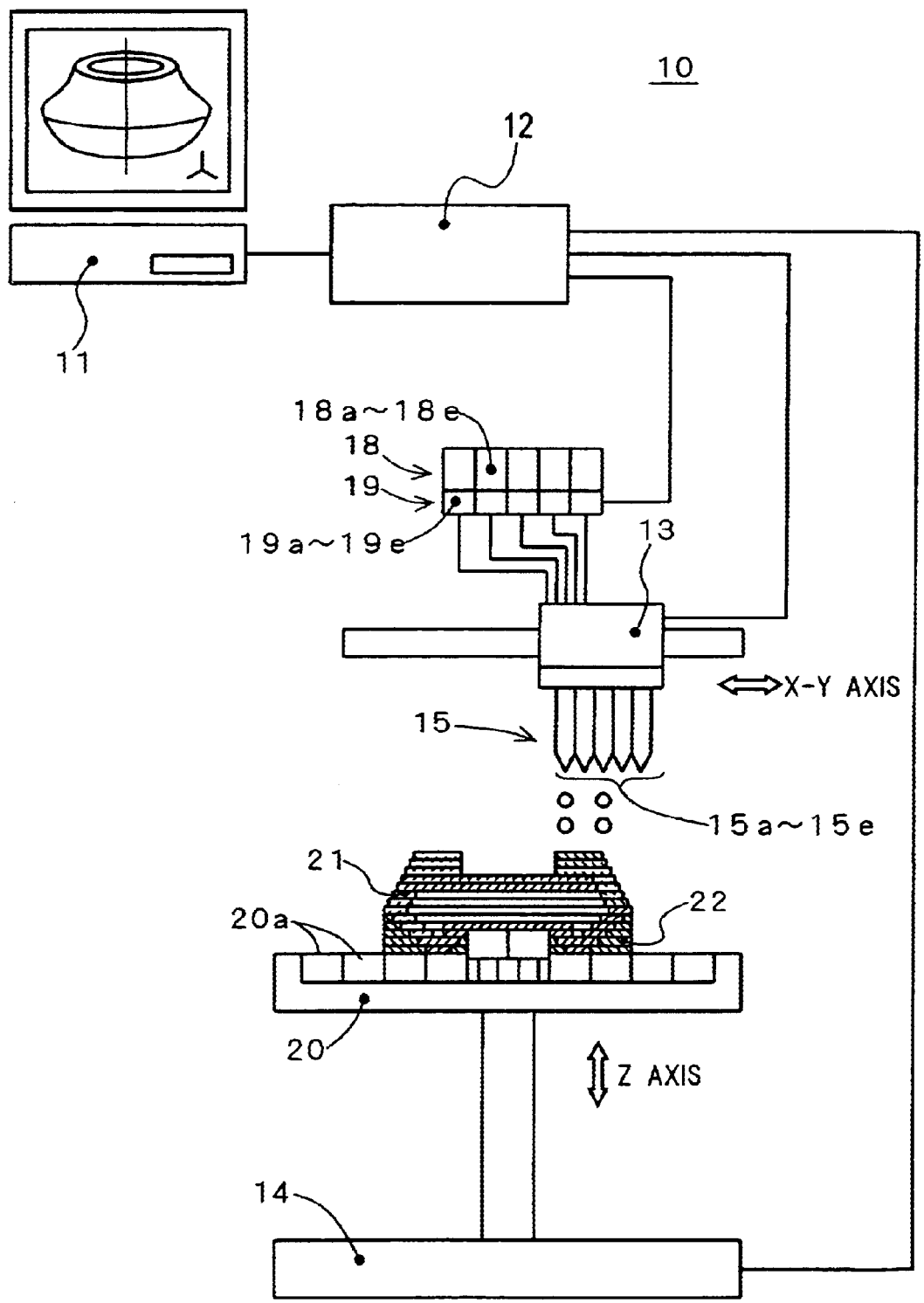
FIG. 1 is a schematic diagram of a 3D object molding apparatus according to first and second preferred embodiments.

This preferred embodiment gives an example of resins being used as two materials for use in the surface and interior molding. In this preferred embodiment, jets of resins can be controlled separately in the surface and interior molding. By using colored resins as surface materials for use in coloring the surface side of a 3D molded product and an uncolored resin as an interior material for use in molding the interior of the product which is invisible to the outside, molding efficiency can be improved and the consumption of colored resins can be reduced.

We will now describe the first preferred embodiment of the present invention referring to the drawings.

1-1. Whole Structure of 3D Object Molding Apparatus

FIG. 1 is a schematic diagram of a 3D object molding apparatus 10 according to this preferred embodiment. The apparatus 10 comprises a computer 11, a drive control unit 12, an XY-directional driving unit 13, a Z-directional driving unit 14, a nozzle head 15, a tank unit 18, a melting unit 19, and a stage 20.

The computer 11 is for example a common desk-top computer with built-in CPU, memory, etc. This computer 11 converts a 3D object to be molded into a data format and outputs section data, which is obtained by slicing the object into several layers of thin cross-sections, to the drive control unit 12.

The drive control unit 12 serves as control means for controlling drive functions of the XY-directional driving unit 13, the Z-directional driving unit 14, the melting unit 19, the nozzle head 15, and the stage 20. Upon receipt of the section data from the computer 11, the drive control unit 12 gives drive commands to each of the above units according to the section data, whereby a cross-sectional shape of each layer is stacked one above the other on the stage 20.

The XY-directional driving unit 13 is driving means provided to move the nozzle head 15 in a plane defined by X and Y axes. This unit can move the nozzle head 15 to any desired location in the driving range of the plane according to the drive commands from the drive control unit 12.

The Z-directional driving unit 14 is driving means provided to lower the stage 20 as one or several layers of a 3D molded product are formed on the stage 20. This unit moves the stage 20 along the vertical Z axis according to the drive commands from the drive control unit 12. By lowering the stage 20 using the Z-directional driving unit 14 as molding progresses, the nozzle head 15 can be kept from contact with a 3D laminate-molded product on the stage 20.

The tank unit 18 includes a plurality of tanks 18a to 18e to hold different kinds of thermoplastic resins. Each of the tanks 18a to 18e holds a stick-like massive, pellet, or powdery thermoplastic resin which is in a solid state at room temperatures. The melting unit 19 is provided with melting heaters 19a to 19e capable of controlling temperatures in the tanks 18a to 18e in the tank unit 18, respectively. The thermoplastic resins in the tanks 18a to 18e are melted by heating using the corresponding melting heaters 19a to 19e thereunder.

The nozzle head 15 is fixed to the bottom of the XY-directional driving unit 13 and integrally movable with the XY-directional driving unit 13 in the XY plane. The nozzle head 15 includes as many injection nozzles 15a to 15e as the tanks in the tank unit 18. The thermoplastic resins melted in the tanks 18a to 18e are supplied to the corresponding injection nozzles 15a to 15e in an heating and insulating state. The injection nozzles 15a to 15e are nozzles to jet extremely small droplets of thermoplastic resins in molten state, for example, in an ink jet system. Jets of thermoplastic resins from the injection nozzles 15a to 15e are controlled separately by the drive control unit 12, and the thermoplastic resins jetted from the injection nozzles 15a to 15e adhere onto the stage 20 that faces the nozzle head 15. The injection nozzle 15e is a supporting part nozzle to jet a resin forming supporting parts (hereinafter referred to as a supporting part resin) to support overhangs.

The stage 20 serves as a base on which a 3D molded product is to be formed. The thermoplastic resins from the injection nozzles 15a to 15e undergo heat radiation and cooling on the stage 20, thereby changing its state from molten to solid (i.e., being cured).

The upper surface side of the stage 20 on which a molded product is to be formed is divided into a plurality of small regions each provided with a split stage 20a. The split stages 20a independently move up and down at control commands from the drive control unit 12.

To produce a 3D molded product having a plurality of colors or any combination color, this preferred embodiment mainly uses chromatic resins for the surface molding. For the interior molding, on the other hand, an achromatic or uncolored resin is used since coloring is not specifically required. Of the tanks 18a to 18e in the tank unit 18, the tanks 18a to 18c hold colored resins having different color components to apply chromatic colors to the surface of the 3D molded product during the surface molding, and the tank 18d mainly holds an achromatic or uncolored resin for use in the interior molding. The achromatic or uncolored color resin may be a resin of natural color or a white or light-colored resin.

More specifically, the tanks 18a to 18c hold yellow-(Y-), magenta-(M-), and cyan-colored (C-colored) resins, respectively, and the tank 18d holds a white-colored (W-colored) resin. The tank 18e holds a supporting part resin. The resins other than the supporting part resin may be made of the same resin material or of different ones. Examples include resins having good compatibility with the color components of the coloring materials.

As resins for use in laminate molding, this preferred embodiment uses thermoplastic resins since resins that are solid at room temperatures and have low melting points and low melt viscosity permit simple molding. Examples include high-molecular-weight polystyrene and polycaprolactone.

Instead of thermoplastic resins, it is also possible to use photoresist or thermosetting resins, but in this case, an energy line irradiation device becomes necessary to cure the resins adhered onto the stage 20 although the melting unit 19 is unnecessary.

The supporting part resin to form overhang supporting parts 22 may be a thermoplastic resin having a lower melting point than the other resins for use in molding the 3D molded product (hereinafter referred to as molding resins). Examples include a wax type resin and an adipate ester. The use of such a supporting part resin allows only the supporting part resin to be melted and removed when a molded laminate including the overhang supporting parts 22 is placed under temperatures higher than the melding point of the supporting part resin and lower than the melting point of the molding resins. Accordingly, a desired finished product, i.e., 3D molded product, can be obtained.

1-2. Operation of 3D Object Molding Apparatus 10

Figure 2:
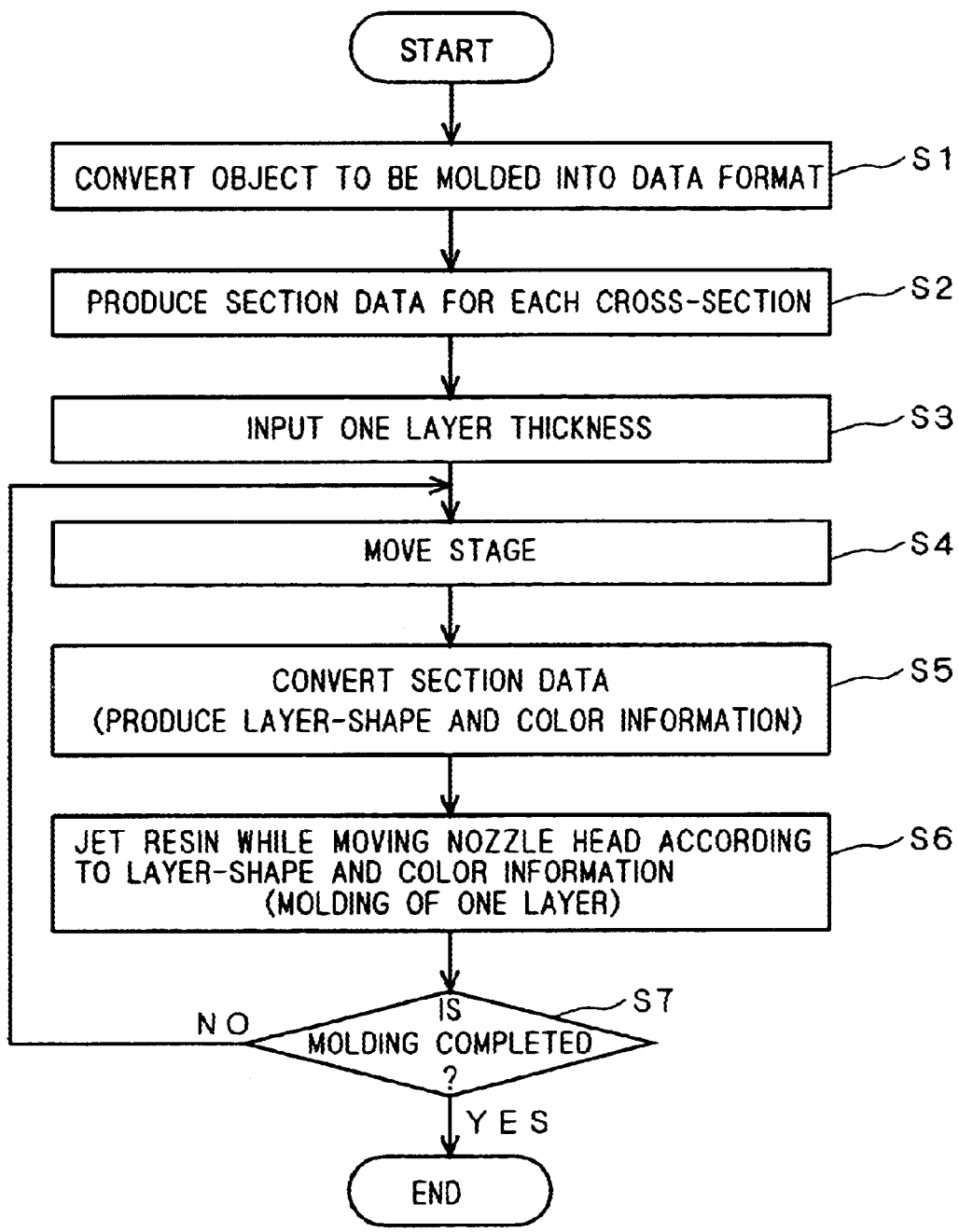
FIG. 2 is a flow chart showing an example of the operation of the 3D object molding apparatus according to the first and second preferred embodiments.

Next, we will describe the operation of the 3D object molding apparatus 10. FIG. 2 is a flow chart showing an example of the operation of the 3D object molding apparatus 10 according to this preferred embodiment.

First, the computer 11 coverts a 3D object to be molded which has, for example, color patterns on its surface, into a data format as model data (step S1). This model data to be the basis for molding may be 3D color model data produced by common 3D CAD modeling software or may be shape data and texture measured by a 3D shape input device.

In such model data, color information may cover only the surface of a 3D model or may cover even the interior of the model. In molding in the latter case, it is possible to use only the color information on the surface of the model or to use all color information covering even the interior of the model. This preferred embodiment uses the color information on the vicinity of the surface of a 3D model.

When the object to be molded has overhangs in shape, the shape of overhang supporting parts is added to the model data during conversion to data format.

Then, section data on each cross-section is produced from the model data by slicing the object to be molded on the basis of one layer thickness in molding (step S2). More specifically, a cross-section obtained by slicing the object at a pitch corresponding to one layer thickness of laminated resins is cut out of the model data, thereby to produce data on the cross-sectional shape and colored portions.

Figure 3:
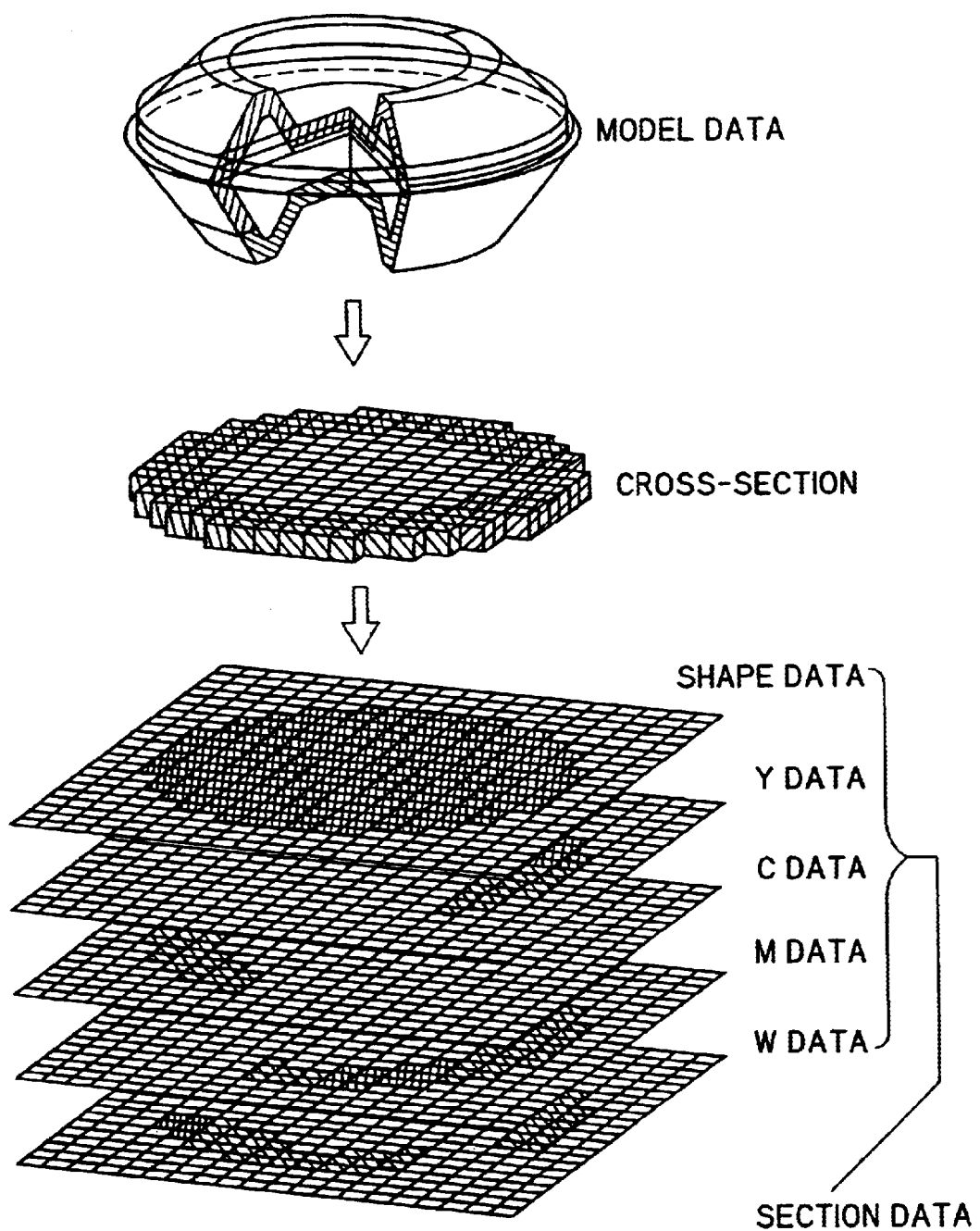
FIG. 3 shows an example of section data.

FIG. 3 shows an example of the section data produced in step S2. As shown, a cross-section is cut out of the model data and finely-divided in a lattice to obtain section data including color information on each voxel. That is, the section data contains color information in a similar manner to a bit-mapped 2D image.

When the object to be molded has overhangs in shape, the section data also contains information on supporting parts which are formed to support overhanging portions. The section data produced by the computer 11 is then transmitted to the drive control unit 12.

In step S3, the information on one layer thickness, used to produce the section data, is transmitted from the computer 11 to the drive control unit 12.

Step S4 and later are performed under the control of the drive control unit 12 on each unit. In step S4, the stage 20 is raised to a location suitable for jet molding of an initially-formed cross-section (i.e., initially-formed layer). By this operation, the stage 20 is located in predetermined alignment with the nozzle head 15 so that resins jetted from the injection nozzles 15a to 15e in the nozzle head 15 can adhere to appropriate places on the stage 20.

After the movement of the stage 20, the process goes to step S5. In step S5, data conversion means (not shown) provided within the drive control unit 12 converts the section data (e.g., makes tone conversion) to produce information on the layer shape and color suitable for the size of droplets from the injection nozzles 15a to 15 e.

In step S6, the drive control unit 12 gives drive commands to the XY-directional driving unit 13 according to the layer-shape and color information obtained by the above data conversion. This causes the nozzle head 15 to move in a predetermined direction and the injection nozzles 15*a* to 15*e* to jet resins appropriately along with the movement.

According to the color information derived from the object to be molded, the Y-, M-, and C-colored resins are jetted onto the parts corresponding to the surface and its vicinity of the 3D molded product. This is color surface molding of the 3D molded product. On the other hand, the W-colored resin is jetted onto the parts corresponding to the interior of the product. This is the interior molding of the 3D molded product.

When the object to be molded has overhangs in shape, the supporting part resin is jetted to form the overhang supporting parts 22 to support overhanging portions.

The resins adhered onto the stage 20 are cooled by spontaneous heat radiation or by cooling means (not shown) provided within the stage 20, thereby changing its state from molten to solid (i.e., being cured).

In this fashion, a layer of cross-section of the 3D molded product is molded in step S6.

After molding of one layer is completed, the process goes to step S7. In step S7, the drive control unit 12 determines whether the molding of the 3D molded product is completed. For "NO", the process returns to step S4 to mold the next layer. For "YES", the molding process is completed.

When the process returns to step S4, the stage 20 is lowered by the height of the previously formed layer so that in the formation of the next layer, the nozzle head 15 is in proper alignment with a molded laminate on the stage 20.

For high-precision molding or when one layer thickness according to the information used in the production of the section data is less than the thickness of the actually formed layer, the height of the formed layer may be adjusted by cutting the excess portion with a cutter on a layer basis. When one layer thickness according to the information used in the production of the section data is more than the thickness of the actually formed layer, molding may be repeated several times based on the same section data until the actual thickness reaches the thickness used in the production of the section data, or several droplets may be jetted in each place in one molding operation.

Through the aforementioned operations, a new layer is stacked on top of the initially-formed layer. By repeating such operations by the number of cross-sections, colored layers are successively stacked on top of each other on the stage 20. Eventually, a 3D molded product 21 of the object is produced on the stage 20. This 3D molded produce 21 has a colored surface.

Figure 4A:
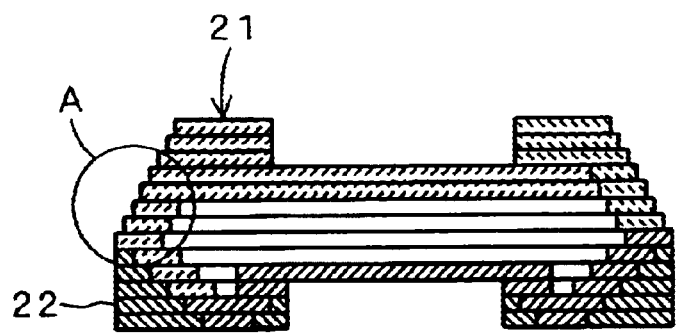
FIGS. 4A and 4B show a 3D molded product obtained in the first and second preferred embodiments.
Figure 4B:
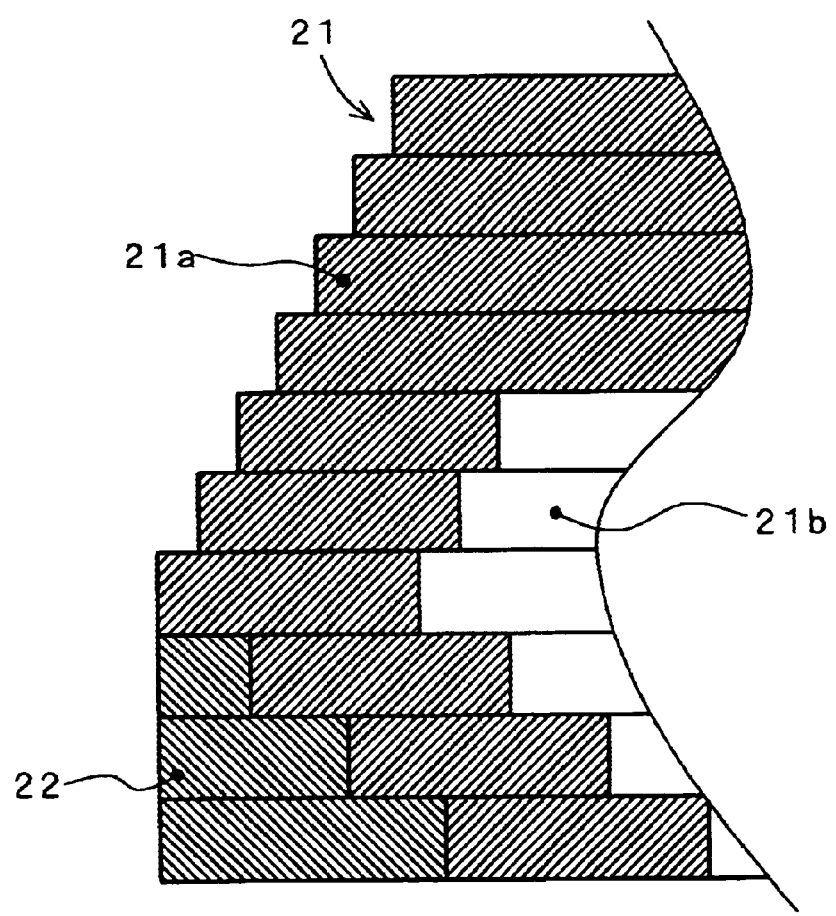

FIGS. 4A and 4B show an example of the 3D molded product 21. FIG. 4A is a cross-sectional view of the 3D molded product 21, and FIG. 4B is an enlarged view of the portion A in FIG. 4A. In FIG. 4B, the surface side 21*a* of the 3D molded product 21 (diagonally shaded area) is colored with the Y-, M-, C-colored resins, and the interior side 21*b* is molded out of the W-colored resin. The configuration of the 3D object molding apparatus 10 according to this preferred embodiment allows the surface side of the 3D molded product to be colored in the molding process. This achieves short-time low-cost color molding with ease without manual operation.

In FIG. 4B, the colored area ranges from the surface to some interior side of the 3D molded product 21. This is because coloring only the surface side strictly requires high-precision control over the amount of travel of the nozzle head 15 and each resin's injection timing; therefore the color information included in the section data is offset a predetermined width to the interior side. Offsetting the colored area a predetermined width to the interior side as in FIG. 4B prevents the white resin of the interior from being exposed even if scratches are made on the surface of the 3D molded product 21. On the other hand, if high-precision control is exercised to color only the surface side, the amount of colored resins to be used can be reduced.

When the 3D molded product 21 has overhangs in shape, the overhang supporting parts 22 are integrally molded at the completion of the flow chart of FIG. 2. In this case, after the completion of molding, the 3D molded product 21 is placed under temperatures higher than the melting point of the supporting part resin and lower than the melting point of the other resins. This allows only the overhang supporting parts 22 to be melted and removed. In this fashion, the use of the supporting part resin permits the production of a 3D molded product from any complicated-shaped object.

The foregoing description roughly gives the configuration and operation of the 3D object molding apparatus 10 according to this preferred embodiment. With an introduction of CAD, CAM, and CAE systems into the computer 11, molding speed and design quality can be further improved.

1-3. Coloring

We will now describe coloring in the molding process according to this preferred embodiment. In this preferred embodiment, a plurality of colored resins of three primary colors (Y, M, C) are laminated in layers on the surface side of the 3D molded product 21. This allows coloring of the product 21 in the molding process.

The injection nozzles 15*a* to 15*c* jet Y-, M-, C-colored resins which can represent different color components by subtractive color mixture, and the injection nozzle 15*d* jets a white-colored resin. Achromatic resins generally include white- and creamy-colored resins, so the injection nozzle 15*d* should jet a resin which is white in the achromatic state.

By using a white-colored resin as an interior molding material of the 3D molded product 21 jetted from the injection nozzle 15*d*, combination colors or gradations in color can be represented in combination with a set of small droplets of resins from the injection nozzles 15*a* to 15*d*.

For coloring, three primary colors (Y, M, C) should generally be mixed, but to represent the color intensity, it is effective to mix a white-colored resin with the three primary colors. In common printers which print characters and images with ink or toner on white paper, for example, the use of white paper as base materials has eliminated the necessity for the use of a white ink. In this case, the intensity of each color component can be represented only by the use of three colors Y, M, C in principle. However, with no base material as in the case of 3D molding, it is especially effective to use a white-colored resin.

That is, mixture of the color components Y, M, C, can represent dark colors, but not white. If a light-colored resin (e.g., white) prepared for the interior molding is used also for the coloring of the surface side, appropriate coloring of the 3D molded product 21 becomes possible.

We will now describe an example of injection patterns of resins to represent the color intensity in coloring the 3D molded product 21.

FIG. 5 shows an example of gradations of cyan. When the drive control unit 12 makes a predetermined tone conversion, multi-level tone data included in the section data is converted into binary data on each dot included in a predetermined area. This binary data gives information on the on/off control of the injection nozzles 15*a* to 15*e*.

An example of the predetermined area is shown in FIG. 5. By varying the injection pattern of resins in the predetermined area for each color component, combination colors and gradations in color can be represented. To represent light cyan, a drop of cyan should be applied to a part of the predetermined area and white to the other parts. To represent dark cyan, four drops of cyan should be applied to the whole predetermined area. By varying the injection ratio of cyan to white resins in the predetermined area in this way, a change of gradations in color between light cyan to dark cyan can be represented appropriately.

In the example of FIG. 5, for convenience of description, the predetermined area for coloring obtained by the tone conversion is comprised of four injection regions, but the present invention is not limited thereto. For instance, when the section data having a 256-level gradation is converted into binary data for use in the on/off control without degrading its gradations, the predetermined area shall be comprised of 256 injection regions.

FIG. 6 shows an example of gradations between light cyan to light yellow. In FIG. 6, the extreme left is the injection pattern of C and W to represent light cyan, and the extreme right is the injection pattern of Y and W to represent light yellow. The gradations in color between light cyan to light yellow through combination colors can be represented by varying the injection ratio of C, Y, W in the predetermined area as shown in FIG. 6.

Figures 7A, 7B:
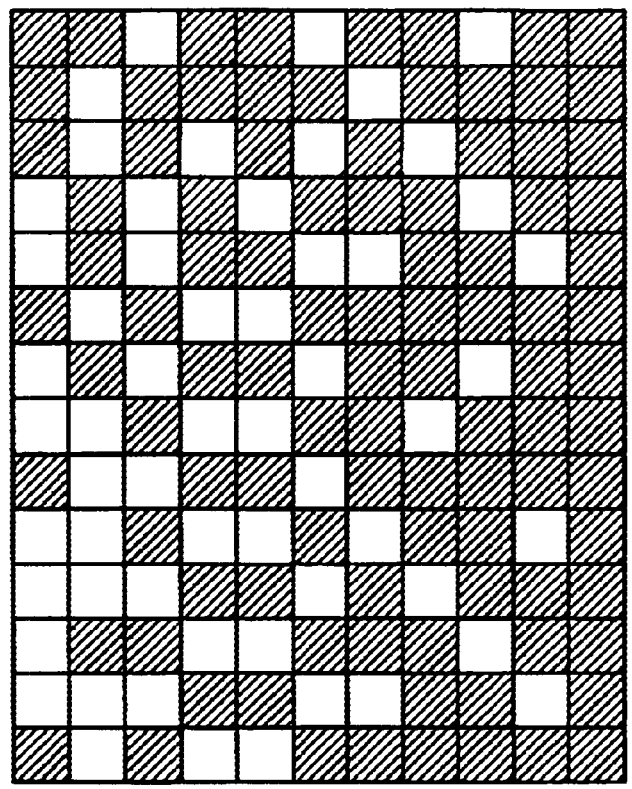
FIGS. 7A and 7B show an example of coloring.

FIGS. 7A and 7B show a group of a plurality of predetermined areas for coloring. FIG. 7A shows the injection pattern of C and W, and FIG. 7B concretely shows the form of coloring represented by the injection pattern of FIG. 7A. If the drive control unit 12 can control the injection patterns as shown in FIGS. 7A, 7B, the 3D molded product 21 can be colored in the molding process.

When a plurality of adjacent predetermined areas represent the same tone by the same injection pattern, regular arrangement of those patterns may produce a pattern that is not on the object to be molded, on the 3D molded product 21. To avert such a situation, it is preferable to use different injection patterns even to represent the same tone. FIGS. 8A to 8C show examples of variations in the injection patterns. FIG. 8A shows an example of three drops of white versus a drop of cyan; FIG. 8B shows an example of two drops of white versus two drops of cyan; and FIG. 8C shows an example of a drop of white versus three drops of cyan. When adjacent areas have the same tone, the drive control unit 12 serves as injection pattern decision means to vary the injection patterns from the injection nozzles 15a to 15d (e.g., as shown in FIG. 8A for a drop of cyan; as shown in FIG. 8B for two drops of cyan; as shown in FIG. 8C for three drops of cyan). This prevents a pattern that is not on the object to be molded from appearing on the 3D molded product 21. The selection of the injection patterns in FIGS. 8A, 8B, and 8C may be made in a random fashion or may be made in a regular fashion.

As above described, this preferred embodiment uses Y-, M-, and C-colored resins to mold around the surface of the 3D molded product 21 and a white-colored resin to mold the interior, thereby allowing colors, corresponding to the object to be molded, to be applied to the surface of the product in the molding process.

As an alternative, the colored resins from the injection nozzles 15a to 15c may have different color components (e.g., red, green, blue). However, the use of resins of three primary colors (Y, M, C) has an effect of being able to apply any color component including neutral tints to the surface side of the 3D molded product 21.

The resin from the injection nozzle 15d for use in the interior molding is not limited to a white-colored resin, but it may be a creamy-colored resin. However, it is preferable to use a white-colored resin in the interior molding in order to clearly reproduce white color and gradations of the object to be molded on the 3D molded product 21.

Although three colors (Y, M, C) can reproduce black on the surface side of the 3D molded product 21, another injection nozzle to jet a black-colored resin may be provided for clearer reproduction.

1-4. Structure of Nozzle Head

We will now describe an example of the structure of the nozzle head 15 in the 3D object molding apparatus 10.

Each of the injection nozzles 15a to 15e in the nozzle head 15 has pressure-developing means such as a piezoelectric actuator. The pressure-developing means apply predetermined pressure to the resins in molten state in the nozzles, whereby resins in liquid form are jetted from the tips of the nozzles.

With such a structure, the drive control unit 12 can independently control drive functions of the pressure-developing means of the respective injection nozzles 15a to 15e. This allows separate control over jets of colored resins and resins other than the colored resins.

Since each of the injection nozzles 15a to 15e in the nozzle head 15 can be controlled separately, we can consider several examples of the structure of the nozzle head 15.

One example is to provide the independently controllable nozzle head 15 with a plurality of nozzle units each comprised of a plurality of injection nozzles 15a to 15e arranged in a straight line as shown in FIG. 1.

FIGS. 9A and 9B show examples of the structure of the nozzle head 15 for coloring the 3D molded product. FIG. 9A shows an example of the nozzle head 15 which separately jets five kinds of resins including resins of three primary colors, a white resin, and a supporting part resin, and FIG. 9B shows an example of the nozzle head 15 which jets further a black resin in addition to the resins in FIG. 9A. In FIGS. 9A and 9B, Y indicates the injection nozzle to jet a yellow-colored resin; M is the injection nozzle to jet a magenta-colored resin; C is the injection nozzle to jet a cyan-colored resin; W is the injection nozzle to jet a white-colored resin; S is the injection nozzle to jet a supporting part resin; and K is the injection nozzle to jet a black-colored resin.

As shown in FIG. 9, the injection nozzles 15a to 15e (or 15a to 15f) arranged in a straight line form a single nozzle unit 17. By arranging such nozzle units 17 side by side with each other, a plurality of injection nozzles are arranged in the form of a matrix. This allows effective and reliable color molding. When the nozzle head 15 is moved in the direction X, for example, molding of a width of the nozzle head 15 in the direction Y can be performed as a unit with a single scan. This enhances molding efficiency and reduces molding time.

In FIGS. 9A and 9B, the axes of the plurality of injection nozzles (i.e., injection directions) are arranged to be parallel to each other. If the drive control unit 12 jets the respective resins in proper time sequence with the movement of the nozzle head 15 in the direction X or Y, a plurality of colors can be mixed in the predetermined area.

Another example is to configure the independently controllable nozzle head 15 so that, out of the injection nozzles 15a to 15d, 15f which jet resins other than the supporting part resin, the injection nozzles 15a to 15c and 15f for jetting Y-, M-, C-, and K-colored resins are arranged around the injection nozzle 15d for jetting a white-colored resin to be used in the interior molding.

Figure 10A:
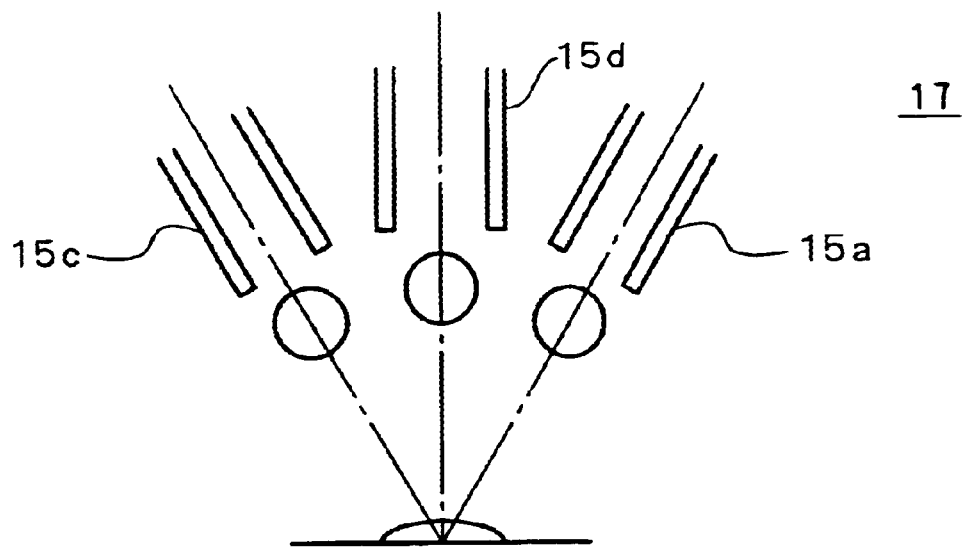
FIGS. 10A and 10B schematically show the configuration of a plurality of concentrically arranged injection nozzles according to the first and second preferred embodiments.
Figure 10B:
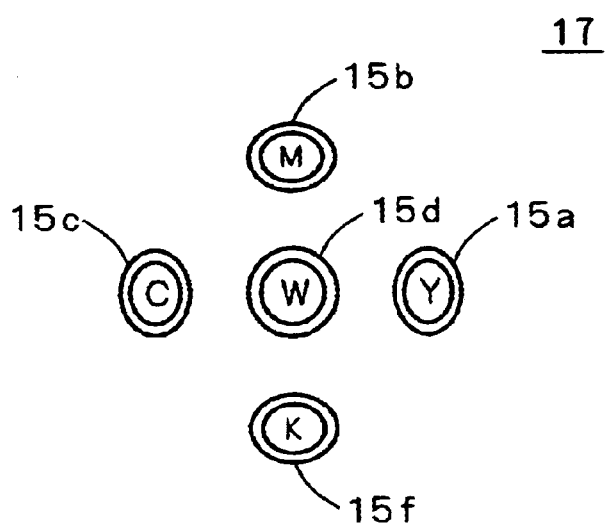
Figure 11A:
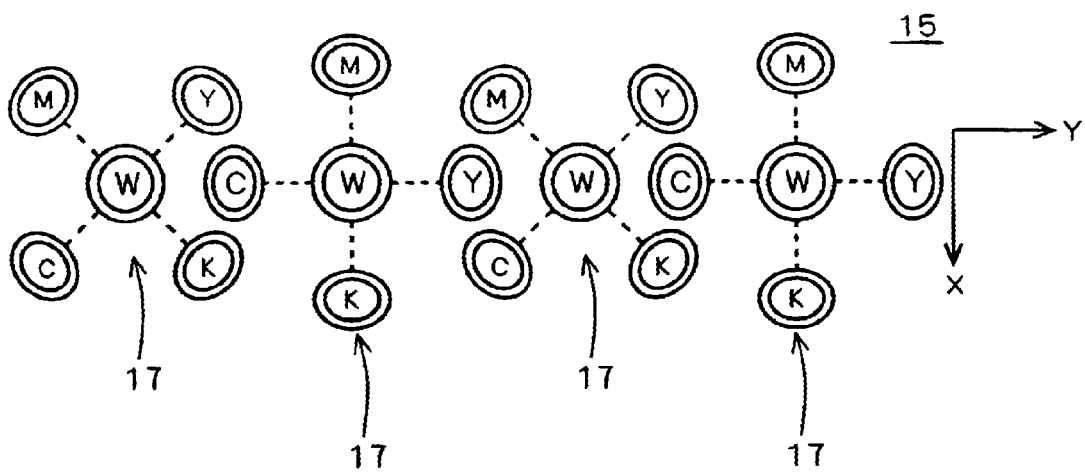
FIGS. 11A and 11B show another examples of the structure of the nozzle head according to the first and second preferred embodiments.
Figure 11B:
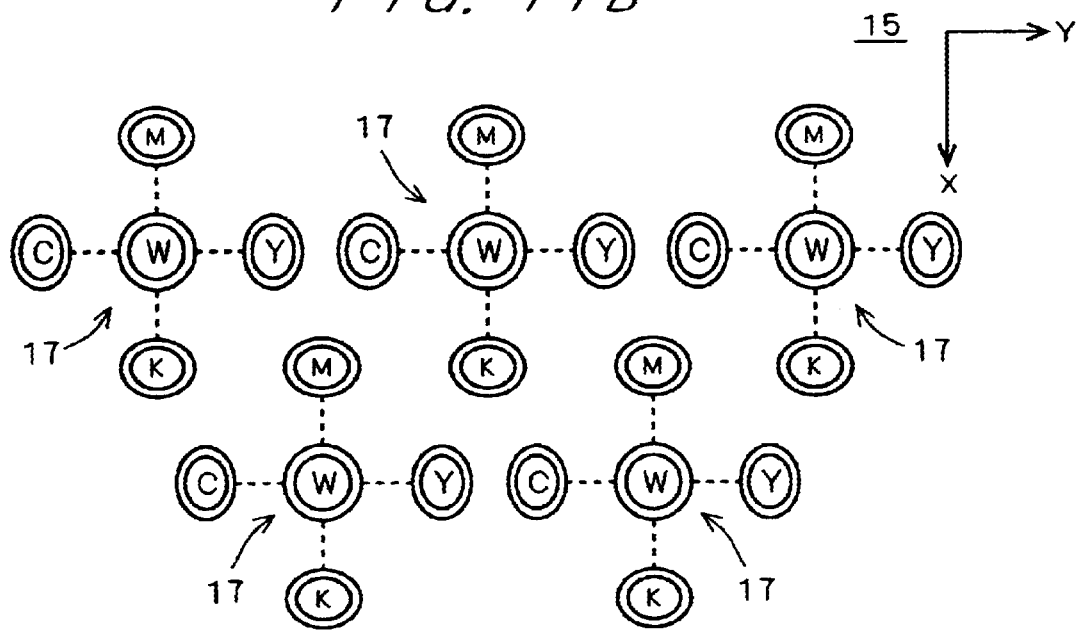

FIGS. 10A and 10B schematically show such a configuration. FIGS. 10A and 10B are schematic diagrams viewed from the side and from the above, respectively. As shown in FIG. 10B, the injection nozzles 15a to 15c and 15f are arranged around the injection nozzle 15d for jetting a white-colored resin used in the interior molding, and as shown in FIG. 10A, their axes (i.e., injection directions) intersect with each other in a predetermined area for coloring. In this configuration, the colored resins are jetted simultaneously into the predetermined area for coloring. When the injection nozzles 15a to 15f forms one nozzle unit 17, effective and reliable color molding is made possible by arranging a plurality of nozzle units 17 as shown in FIGS. 11A and 11B. FIG. 11A shows an example of the nozzle head 15 in which a plurality of nozzle units 17 in FIGS. 10A and 10B are arranged in a straight line in the direction Y; and FIG. 11B shows another example of the nozzle head 15 in which a plurality of nozzle units 17 in FIGS. 10A and 10B are arranged in the XY plane. When a scan in the direction X using the nozzle head 15 in FIG. 11A leaves a gap in molding, the configuration of FIG. 11B should be adopted.

1-5. Stage 20

The surface side of the stage 20 on which a molded product is to be formed is divided in a lattice, each provided with a split stage 20a which is independently movable up and down. The up-and-down movements of these split stages 20a are controlled by the drive control unit 12. For example, the drive control unit 12 controls drive functions of a stepping motor provided with a split stage 20a, thereby to move the split stage 20a up and down.

Referring to FIGS. 12A to 12D, the production of a 3D molded product having depressions on its rear surface is made possible by controlling the up-and-down movements of the split stages 20a separately. More specifically, as shown in FIG. 12A, split stages 20a located in portions corresponding to depressions are raised to the extent that they do not interfere with the nozzle head 15. In this condition, the nozzle head 15 jets resins into the molding portion other than the portions corresponding to the depressions. As the molding process progresses and the stage 20 has been lowered, the split stages 20a in the portions corresponding to depressions are raised to the extent that they do not interfere with the nozzle head 15 (FIG. 12B). After the completion of molding, depressions of predetermined shape are formed in the rear surface of the 3D molded product 21 (FIGS. 12C, 12D). By adopting such split stages 20a, depressions in desired shapes can be formed in the rear surface of the 3D molded product 21. Further, the amount of resins to be used in the molding of the rear surface side can be reduced and the molding speed is improved. This improves molding efficiency and reduces the manufacturing cost of the 3D molded product 21. Alternatively, it is also feasible to reduce the amount of the supporting part resin by moving up and down the split stages 20a in the overhang supporting parts.

Figure 13:
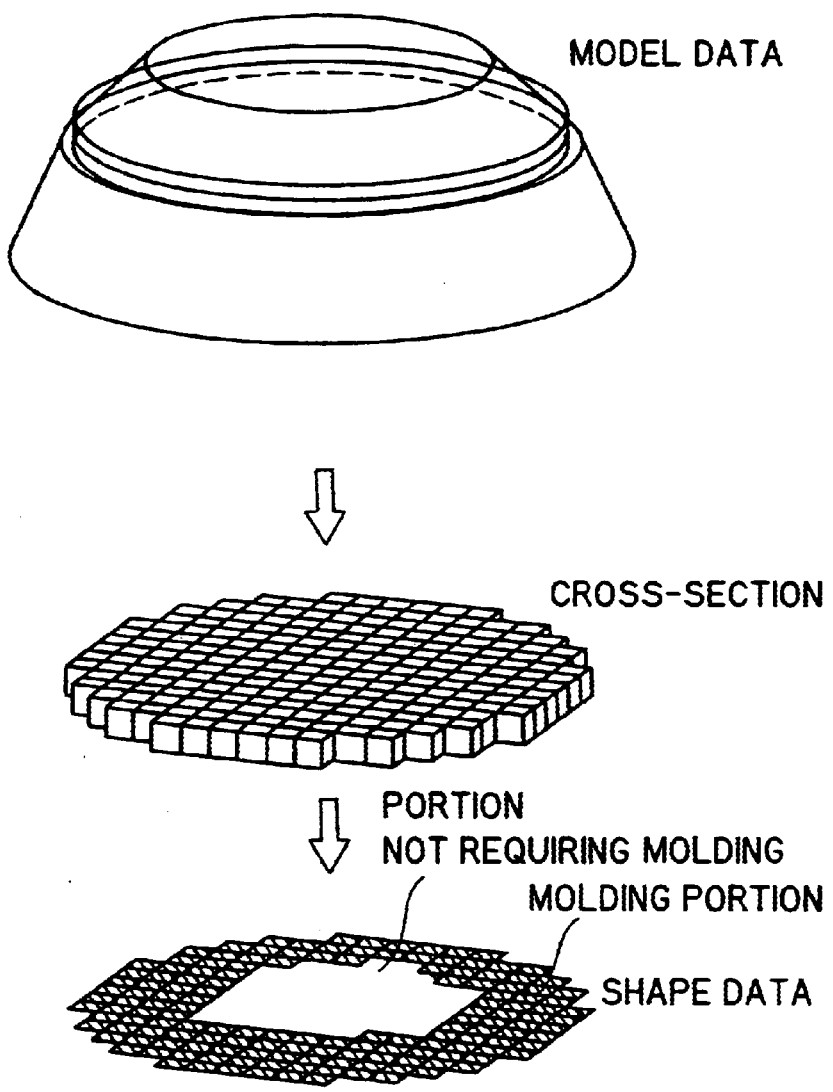
FIG. 13 shows an example of section data in using the split stages.

In the aforementioned case where depressions are formed in the rear surface side of the 3D molded product 21 by moving the split stages 20a up and down separately in the stage 20, it is needless to say that, in the production of the section data for use in molding, data on portions not requiring molding should be deleted from data on the molding portions as shown in FIG. 13 in consideration of the up-and-down movements of the split stages 20a.

2. SECOND PREFERRED EMBODIMENT

This preferred embodiment adopts a configuration similar to that of the first preferred embodiment described with reference to FIGS. 1 to 13. As materials for use in molding a 3D molded product, this preferred embodiment uses a molding resin to form the shape of the product and coloring resins to color the product. We will now describe the case where the molding resin is jetted from a predetermined molding nozzle and coloring resins from predetermined coloring nozzles.

To produce a 3D molded product having a plurality of colors or any given combination color, a plurality of resins having different color components are used as coloring agents applied to the product. Further, an achromatic resin, for example, is used in molding the portions not requiring coloring since using colored resins for such portions decreases molding efficiency.

Of the tanks 18a to 18e in the tank unit 18 in FIG. 1, the tanks 18a to 18c hold coloring resins having different color components for use in coloring a 3D molded product, while the tank 18d holds, for example, an uncolored molding resin for use in molding mainly the portions not requiring coloring. The molding resin may be a resin of a natural color or a white or light-colored resin.

In this preferred embodiment, the injection nozzles 15a to 15c to jet the coloring resins having different color components serve as coloring nozzles, while the injection nozzle 15d to jet the molding resin serves as a molding nozzle.

More specifically, the tanks 18a to 18c hold yellow-(Y-), magenta-(M-), and cyan-colored (C-colored) resins (i.e., coloring resins), respectively, and the tank 18d holds a white-colored resin (i.e., molding resin). Further, the tank 18e holds a supporting part resin. The resins other than the supporting part resin may be made of the same resin material or of different ones.

The supporting part resin for use in molding the overhang supporting parts 22 may be a thermoplastic resin having a lower melting point than the molding and coloring resins for use in molding the 3D molded product. Examples include a wax type resin and an adipate ester. The use of such a supporting part resin allows only the supporting part resin to be melted and removed when a molded laminate including the overhang supporting parts 22 is placed under temperatures higher than the melding point of the supporting part resin and lower than the melting point of the molding and coloring resins. Accordingly, a desired finished product, i.e., 3D molded product, can be obtained.

The production of the 3D molded product is made by the 3D object molding apparatus 10 which operates according to the flow chart of FIG. 2 as in the first preferred embodiment of the present invention.

In the model data obtained in step S1 of FIG. 2, the color information may cover only the surface of a 3D model or may cover even the interior of the model. In molding in the latter case, it is possible to use only the color information on the surface of the model or to use all color information covering even the interior of the model. In the formation of a 3D molded product of a human body model, for example, you may want to color each viscus in a different color. In such a case, the color information on the interior of the model and a transparent resin as a molding resin are used to obtain a desired 3D molded product.

In step S6, Y-, M-, and C-colored resins are jetted into portions corresponding to the vicinity of the surface of the 3D molded product according to the color information derived from the object to be molded. This achieves coloring of the 3D molded product in the molding process. On the other hand, a white-colored molding resin is jetted into the other portions not requiring coloring.

By coloring the surface side of a 3D molded product through the processing according to the flow chart of FIG. 2, a finally-obtained 3D molded product 21 will be similar to that shown in FIGS. 4A and 4B. In FIG. 4B, the surface side 21a of the 3D molded product 21 (diagonally shaded area) is colored with the Y-, M-, and C-colored resins and the interior side 21b is molded out of the W-colored resin. That is, the colored portions in FIG. 4B are formed of the colored resins from the injection nozzles (coloring nozzles) 15a to 15c and the other portions are formed of the molding resin from the injection nozzle (molding nozzle) 15d.

Therefore, this preferred embodiment also allows coloring of the 3D molded product in the molding process. This facilitates short-time low-cost color molding without manual operation.

While FIGS. 4A and 4B show the case where the surface side of the 3D molded product 21 is colored, it is also possible to color the interior side of the 3D molded product 21 in this preferred embodiment. That is, this preferred embodiment enables coloring of any desired part.

As above described, this preferred embodiment uses Y-, M-, and C-colored resins as coloring resins for use in molding the colored portions of the 3D molded product 21 and a white-colored resin as a molding resin for use in molding non-colored portions. This allows coloring corresponding to the object to be molded in the molding process.

Alternatively, a white-colored resin may be included in the plurality of resins having different color components for use in molding the colored portions of the 3D molded product. This facilitates clear reproduction of the color intensity and gradations on the 3D molded product as well as allowing short-time low-cost coloring of the product in the molding process.

That is, a white-colored resin prepared for the molding may be used to mold the colored portions of the 3D molded product 21 in combination with the Y-, M-, and C-colored resins, and a molding resin of any desired color may be used to mold the portions other than the colored portions. This makes it possible to represent colors that are not available from the three colors (Y, M, C), thereby facilitating clear reproduction of the color intensity and gradations on the 3D molded product as well as allowing coloring corresponding to the object to be molded in the molding process.

3. THIRD PREFERRED EMBODIMENT

This preferred embodiment shows an example of using color inks as materials for use in the surface molding and a resin as a material for use in the interior molding. In this preferred embodiment, jets of inks and resins can be controlled separately in the surface and interior molding.

Referring to the drawings, we will now describe a third preferred embodiment of the present invention.

3-1. Whole Structure of 3D Object Molding Apparatus

Figure 14:
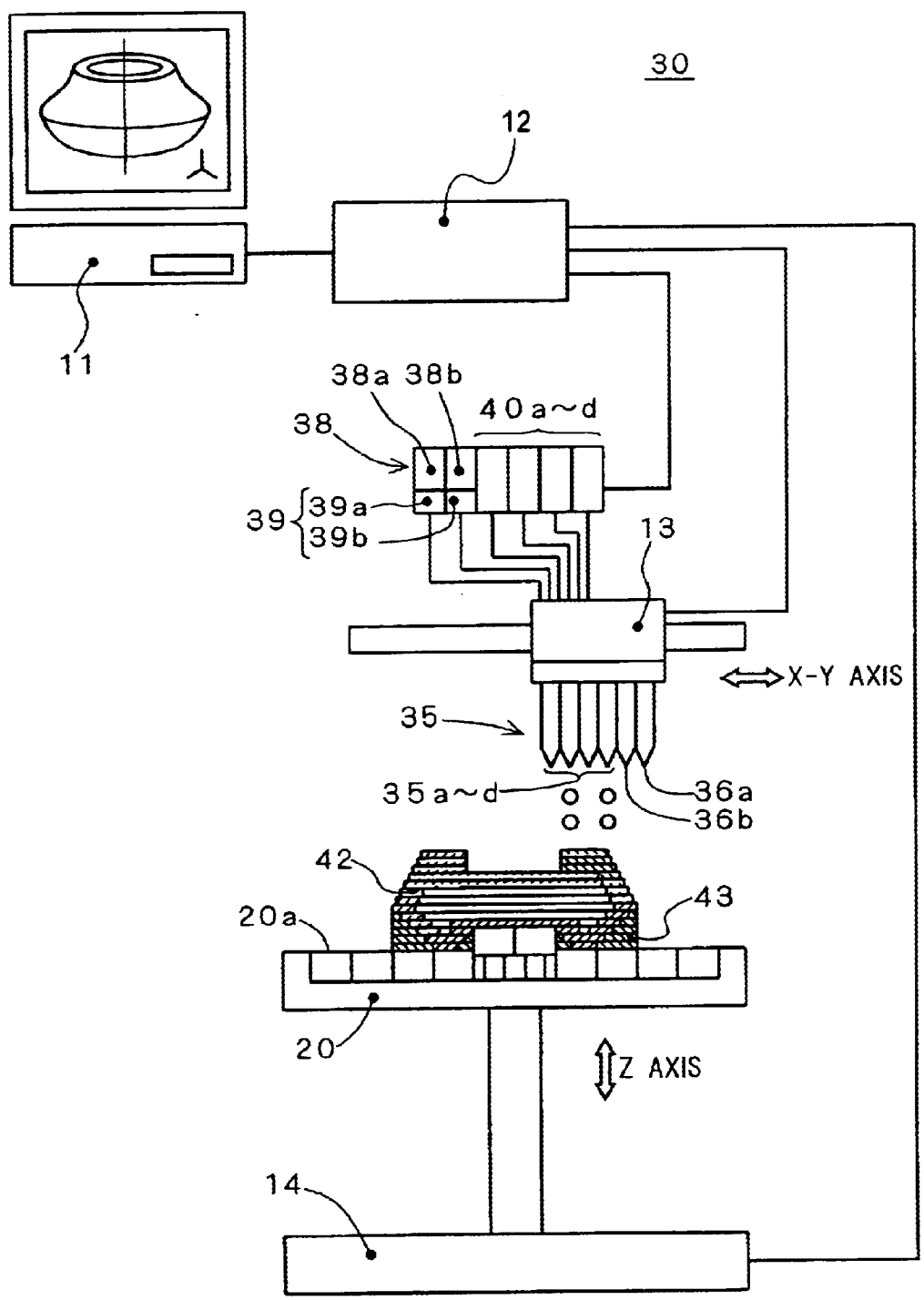
FIG. 14 is a schematic diagram of a 3D object molding apparatus according to third and fourth preferred embodiments.

FIG. 14 is a schematic diagram of a 3D object molding apparatus 30 according to this preferred embodiment. In FIG. 14, the parts having similar effects to those of the first preferred embodiment are designated by similar numerals.

The 3D object molding apparatus 30 comprises the computer 11, the drive control unit 12, the XY-directional driving unit 13, the Z-directional driving unit 14, a nozzle head 35, a tank unit 38, a melting unit 39, and the stage 20 as in the first preferred embodiment.

The computer 11, the drive control unit 12, the XY-directional driving unit 13, the Z-directional driving unit 14, and the stage 20 operate to similar effects as described in the first preferred embodiment and thus further discussion is omitted.

This preferred embodiment differs from the first preferred embodiment in the structures of the nozzle head 35, the tank unit 38, and the melting unit 39.

The tank unit 38 includes two tanks 38a, 38b to hold thermoplastic resins for molding and for supporting part use having different melting points, and a plurality of tanks 40a to 40d to hold inks having different color components. The melting unit 39 is provided with two melting heaters 39a and 39b corresponding to the tanks 38a and 38b to hold thermoplastic resins. The thermoplastic resins in the tanks 38a, 38b are heated and melted by the melting heaters 39a, 39b thereunder, respectively. The inks in the tanks 40a to 40d are in the liquid state at room temperatures; therefore, there is no need to provide melting heaters.

The nozzle head 35 is fixed to the bottom of the XY-directional driving unit 13 and integrally movable with the XY-directional driving unit 13 in the XY plane. The nozzle head 35 includes as many injection nozzles 35a to 35d, 36a, 36b as the tanks in the tank unit 38. The thermoplastic resins melted in the tanks 38a, 38b are supplied to the corresponding injection nozzles 36a, 36b in an heating and insulating state, and the color inks in the tanks 40a to 40d are supplied to the corresponding injection nozzles 35a to 35d. The injection nozzles 35a to 35d, 36a, 36d are nozzles to jet small droplets of inks or resins in an ink jet system, for example. Jets of inks or resins from the injection nozzles are separately controlled by the drive control unit 12. The inks or resins from the injection nozzles adhere onto the stage 20 that faces the nozzle head 35. The injection nozzles 35a to 35d are coloring nozzles to jet different color inks prepared for the coloring of a 3D molded product 42; the injection nozzle 36a is a nozzle to jet a molding resin; and the injection nozzle 36b is a nozzle to jet a supporting part resin.

To produce a 3D molded product having a plurality of colors or any combination color, this preferred embodiment uses resins for both the interior and surface molding. For the surface molding, further, inks having different color components are used. The resins used in molding the 3D molded product are achromatic or uncolored resins since coloring is not specifically required. Of the tanks 38a, 38b for holding resins in the tank unit 38, the tank 38a holds an achromatic or uncolored molding resin. The achromatic or uncolored resin may be a resin of a natural color or a white or light-colored resin. The tank 38b holds a supporting part resin.

The tanks 40a to 40d, on the other hand, hold yellow (Y), magenta (M), cyan (C), and white (W) inks, respectively.

The surface side of the stage 20 on which a 3D molded product is to be formed is divided in a lattice, each provided with the split stage 20a which is independently movable up and down as in the first preferred embodiment.

3-2. Operation of 3D Object Molding Apparatus 30

Figure 15:
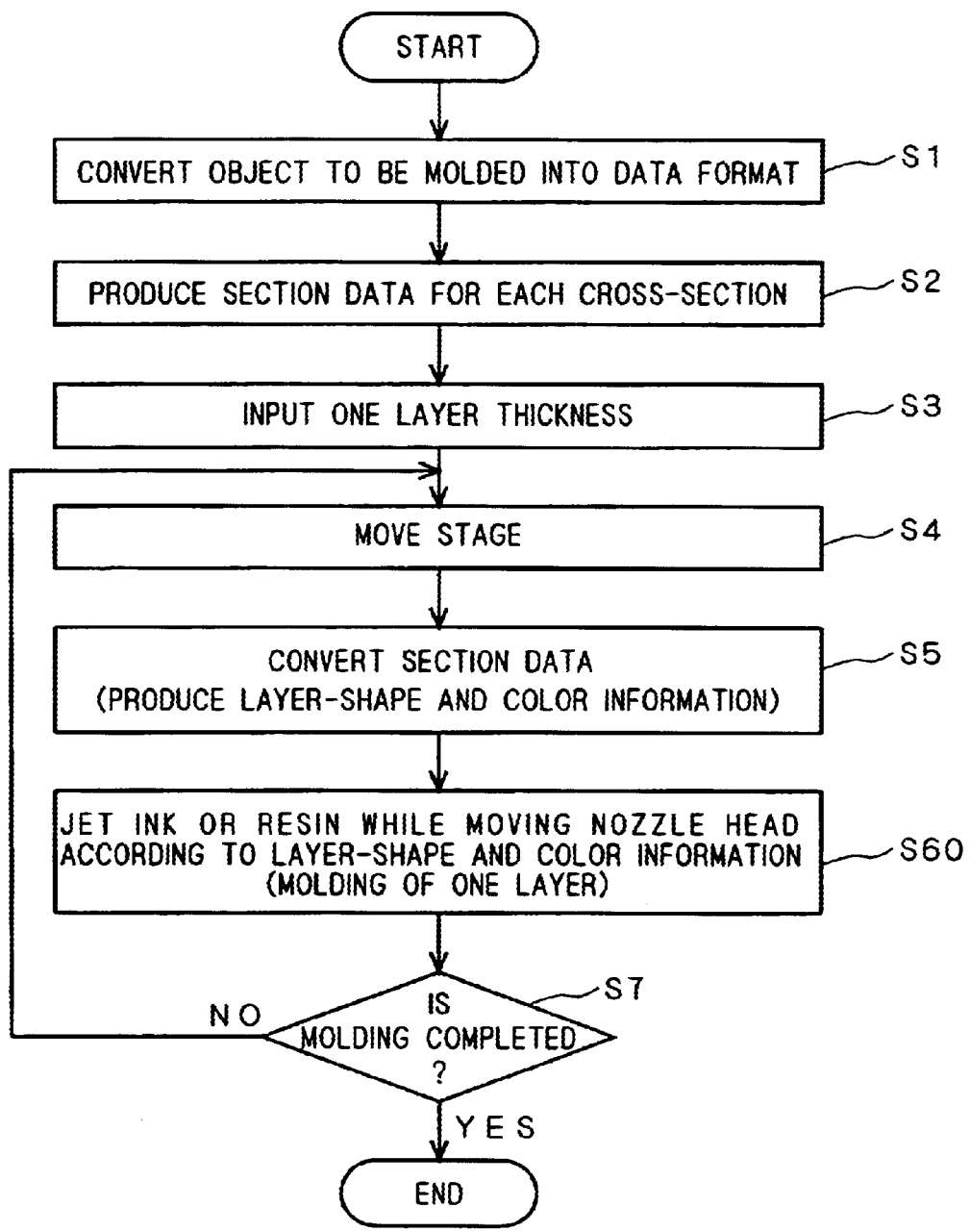
FIG. 15 is a flow chart showing an example of the operation of the 3D object molding apparatus according to the third and fourth preferred embodiments.

Next, we will describe the operation of the 3D object molding apparatus 30. FIG. 15 is a flow chart showing an example of the operation of the 3D object molding apparatus 30 according to this preferred embodiment. The flow chart of FIG. 15 is basically similar to that of FIG. 2 but is different in the processing of step S60.

First, an object to be molded is converted into a data format in step S1 and section data on each cross-section is produced by slicing the object on the basis of one layer thickness in molding in step S2. In step S3, the information on one layer thickness, used to produce the section data, is transmitted from the computer 11 to the drive control unit 12.

Then, the stage 20 is moved to a predetermined position in step S4 and the section data is converted by the data converting means in step S5 to produce information on layer shape and color suitable for the size of droplets from the injection nozzles.

In step S60, the drive control unit 12 gives drive commands to the XY-directional driving unit 13 according to the layer-shape and color information obtained by the above data conversion. This causes the nozzle head 35 to move in a predetermined direction and the injection nozzles to jet inks or resins appropriately along with the movement.

In molding the interior and surface side of a 3D molded product, molding resins are jetted. In the surface molding, further, Y, M, C, and W inks are jetted in addition to the resins according to the color information derived from the object to be molded. This allows color molding of the surface of the 3D molded product.

When the object to be molded has overhangs in shape, the supporting part resin is jetted to mold overhang supporting parts 43 to support the overhanging portions.

The resins adhered to the stage 20 are cooled by spontaneous heat radiation or by cooling means (not shown) provided within the stage 20, thereby changing its state from molten to solid (i.e., being cured).

In this fashion, a layer of cross-section of the 3D molded product is molded in step S60.

After molding of a single layer is completed, the process goes to step S7. In step S7, the drive control unit 12 determines whether the molding of the 3D molded product is completed. For "NO", the process returns to step S4 to repeat the processing therefrom. For "YES", the molding process is completed.

For high-precision molding or when one layer thickness according to the information used in the production of the section data is less than the thickness of the actually formed layer, the height of the formed layer may be adjusted by cutting the excess portion with a cutter on a layer basis. When one layer thickness according to the information used in the production of the section data is more than the thickness of the actually formed layer, molding may be repeated several times based on the same section data until the actual thickness reaches the thickness used in the production of the section data, or several droplets may be jetted in each place in one molding operation.

Figure 16A:
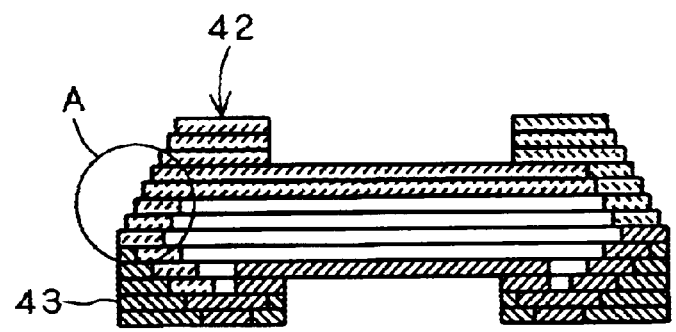
FIGS. 16A and 16B show a 3D molded product obtained in the third and fourth preferred embodiments.
Figure 16B:
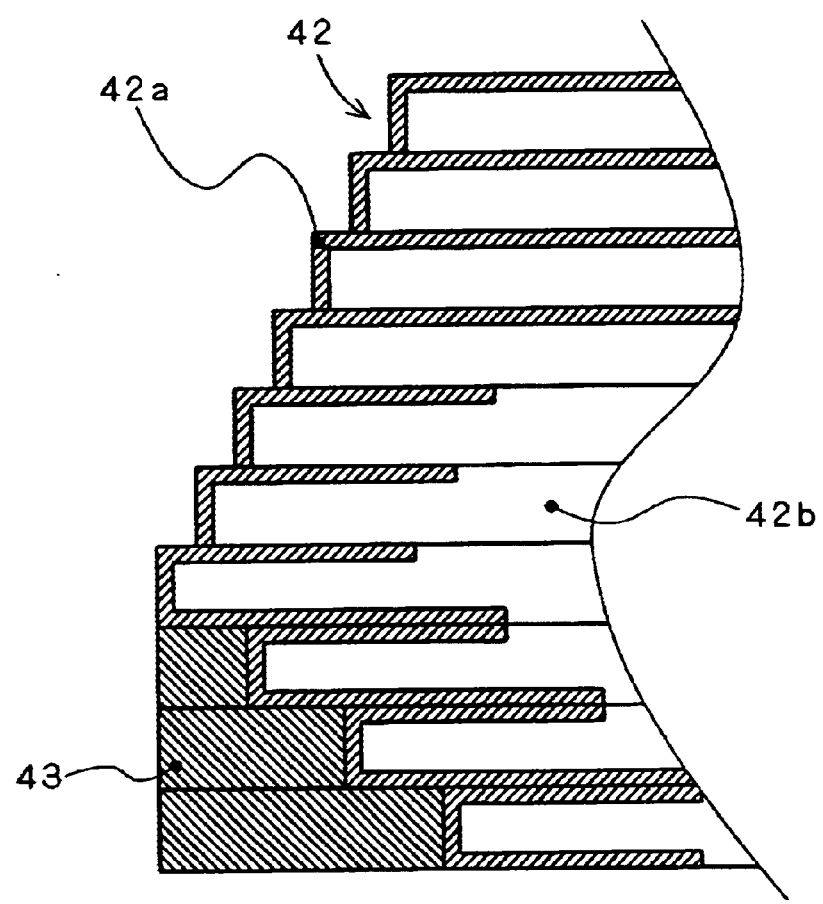
Figure 17A:
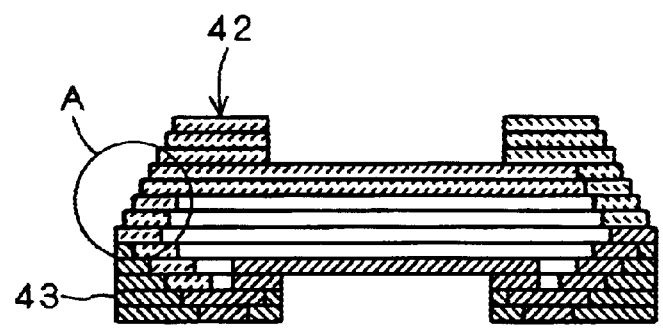
FIGS. 17A and 17B show another 3D molded product obtained in the third and fourth preferred embodiments.
Figure 17B:
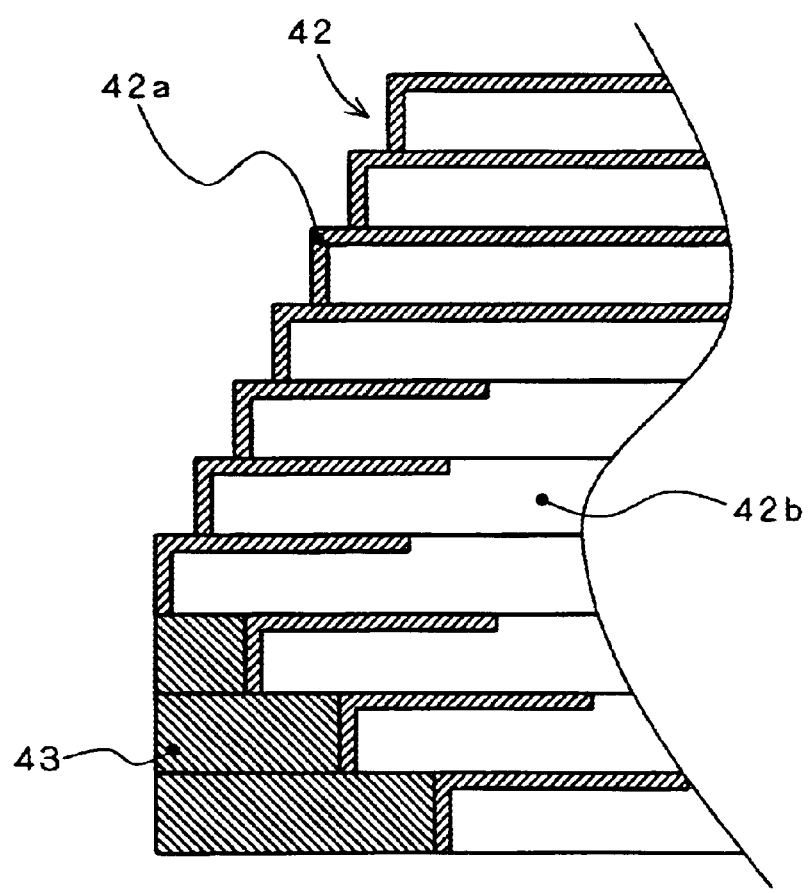

The 3D molded product 42 obtained in this way is shown in FIGS. 16A, 16B, 17A, and 17B. FIGS. 16A and 17A are cross-sectional views of the 3D molded product 42, and FIGS. 16B and 17B are enlarged views of the portions A in FIGS. 16A and 17A, respectively.

In FIG. 16B, the surface side 42a of the 3D molded product 42 (diagonally shaded area) is colored with the Y, M, C, W inks, and the interior side 42b is molded out of the molding resin.

FIGS. 16A and 16B show the case where the 3D molded product 42 has overhangs in shape and color inks for use in coloring the surface side are also jetted into the rear surface side of overhanging portions. To produce such a 3D molded product 42, the nozzle head 35 is required to make a scan twice to mold each layer corresponding to an overhanging portion. In the first scan of the XY plane, only inks are jetted in the vicinity of the surface of the 3D molded product 42. In the second scan of the XY plane, a molding resin is jetted for the molding and inks are jetted in the vicinity of the surface for coloring. With these two scans, even the rear surface side of the overhanging portions of the 3D molded product 42 can be colored. This permits high-fidelity color reproduction of the object to be molded, resulting in a high-quality 3D molded product 42.

As in the above case, FIG. 17B also shows that the surface side 42a of the 3D molded product 42 (diagonally shaded area) is colored with the Y, M, C, W inks and the interior side 42b is molded out of the molding resin.

In FIGS. 17B, however, when the 3D molded product 42 has overhangs in shape, the inks for use in coloring the surface side are not jetted into the rear surface side of the overhanging portions. In common practice, this can rarely be a problem. When no color is applied to the rear surface side of the overhanging portions, the nozzle head 35 only has to make one scan to mold each layer. This improves molding efficiency as compared with the case where the rear surface side of the overhanging portions is colored.

The configuration of the 3D object molding apparatus 30 according to this preferred embodiment allows the surface side of the 3D molded product to be colored in the molding process. This facilitates short-time low-cost color molding without manual operation In FIGS. 16B and 17B, the ink-colored area ranges from the surface to some interior side of the 3D molded product 42. This is because coloring only the surface strictly requires high-precision control over the amount of travel of the nozzle head 35 and each resin's injection timing; therefore the color information included in the section data is offset a predetermined width to the interior side.

When the 3D molded product 42 has overhangs in shape, the overhang supporting parts 43 are integrally molded at the completion of the flow chart of FIG. 15. Thus, after the molding process, the 3D molded product 42 is placed under temperatures higher than the melting point of the supporting part resin and lower than the melting point of the molding resin. Accordingly, only the overhang supporting parts 43 are melted and removed. In this fashion, the use of the supporting part resin permits the production of a 3D molded product of any complicated-shaped object.

3-3. Coloring

We will now describe coloring in the molding process according to this preferred embodiment. In this preferred embodiment, the 3D molded product 42 is produced from a resin and colored in the molding process by jetting four colors of inks (Y, M, C, W) into the surface side.

The injection nozzles 35a to 35c jet Y, M, and C inks, respectively, which can represent different color components by subtractive color mixture, and the injection nozzle 35d jets a white ink. The injection nozzle 36a jets an uncolored resin for use in molding the 3D molded product 42.

The use of the uncolored resin from the injection nozzle 36a allows 3D molding of the 3D molded product 42, and sets of small droplets of inks from the injection nozzles 35a to 35d allow representation of combination colors and gradations on the surface of the 3D molded product 42.

For coloring, inks of three primary colors (Y, M, C) should generally be mixed, but to represent the color intensity, it is effective to add a white ink with the primary-color inks. For this reason, this preferred embodiment uses a white ink in addition to yellow, magenta, and cyan inks. But when the injection nozzle 36a jets a white-colored molding resin as described in the first preferred embodiment, it is unnecessary to use a white ink. This is because this preferred embodiment is designed to use a molding resin as a base material and apply colors by jets of inks into the molding resin. That is, when a white resin is used as a base material, it is unnecessary to use a white ink.

The inks of the respective color components Y, M, C are applied to the molding resin on the stage 20. This enables appropriate coloring of the 3D molded product 42.

In this preferred embodiment, the injection pattern of each ink in coloring the 3D molded product 42 is similar to that of the first preferred embodiment. That is, FIGS. 5 and 8 also show the injection patterns of inks in this preferred embodiment. The details are as described in the first preferred embodiment and thus further discussion is omitted.

As above described, this preferred embodiment uses a resin as a material for use in molding the 3D molded product 42, and further uses Y, M, C, and W inks as materials for use in the surface molding of the product. Thus, the surface side of the 3D molded product can be colored in the molding process, corresponding to the object to be molded.

Alternatively, the inks jetted from the injection nozzles 35a to 35c may have other color components (e.g., red, green, blue). However, the use of the inks of three primary colors (Y, M, C) has an effect of being able to apply any desired color component including neutral tints to the surface of the 3D molded product 42.

While three colors (Y, M, C) can represent black on the surface side of the 3D molded product 42, another injection nozzle to jet a black ink may be provided for high-quality reproduction of black.

3-4. Structure of Nozzle Head

We will now describe an example of the structure of the nozzle head 35 in the 3D object molding apparatus 30.

Each of the injection nozzles 35a to 35d, 36a, 36b in the nozzle head 35 is provided with pressure-developing means such as a piezoelectric actuator, by which predetermined pressure is applied to inks or resins in the molten state in the nozzles whereby inks or resins in liquid form are jetted from the tips of the nozzles.

Such a structure allows the drive control unit 12 to independently control drive functions of the pressure producing means of the respective injection nozzles 35a to 35d, 36a, 36b. This permits independent control over jets of color inks and resins.

Since each of the injection nozzles in the nozzle head 35 can be controlled separately, we can consider several examples of the structure of the nozzle head 35.

One example is to provide the above independently controllable nozzle head 35 with a plurality of nozzle units, each comprised of a plurality of injection nozzles 35a to 35d, 36a, 36b arranged in a straight line as shown in FIG. 14.

FIGS. 18A to 18C show examples of the structure of the nozzle head 35 for coloring a 3D molded product. FIG. 18A shows an example of the nozzle head 35 jetting four kinds of inks including three primary colors and white and two kinds of resins including a molding resin and a supporting part resin. FIG. 18B an example of the nozzle head 35 jetting a black ink in addition to the inks and resins in FIG. 18A. FIG. 18C shows an example of the nozzle head 35 using a white resin as a molding resin and four color inks (blue, green, red, and black) other than yellow, magenta, and cyan inks. In the drawings, Y indicates the injection nozzle to jet a yellow ink; M is the injection nozzle to jet a magenta ink; C is the injection nozzle to jet a cyan ink; W is the injection nozzle to jet a white ink; Pa is the injection nozzle to jet a molding resin; Pb is the injection nozzle to jet a supporting part resin; K is the injection nozzle to jet a black ink; B is the injection nozzle to jet a blue ink; G is the injection nozzle to jet a green ink; R is the injection nozzle to jet a red ink; and P is the injection nozzle to jet a white resin.

As shown in FIGS. 18A to 18C, a single nozzle unit 37 is comprised of two columns (i.e., two lines aligned in the direction Y) of a plurality of injection nozzles for jetting inks (35a to 35h) which are arranged in a straight line, and injection nozzles for jetting molding and supporting part resins (36a to 36c) which are aligned with the injection nozzles for ink 35a to 35h in the direction X. By arranging such nozzle units 37 in the direction Y, a plurality of injection nozzles are arranged in the form of a matrix. Such a configuration allows effective and reliable color molding. When this nozzle head 35 is moved in the direction X, for example, molding and coloring of a width of the nozzle head 35 in the direction Y can be performed as a unit with a single scan. This enhances molding efficiency and reduces molding time.

Since the viscosity of ink is generally lower than that of resin, the pressure-developing means for jetting ink droplets can be made smaller in scale than that for jetting resin droplets. That is, the injection nozzles for ink 35a to 35h are made smaller in scale than the injection nozzles for resin 36a to 36c. Accordingly, the diameter of the injection nozzles for ink 35a to 35h becomes smaller than that of the injection nozzles for resin 36a to 36c.

In this preferred embodiment, the injection nozzles for ink 35a to 35h are configured to be smaller in diameter than the injection nozzles for resin 36a to 36c as shown in FIGS. 18A to 18C. This allows ink droplets to be smaller than resin droplets, thereby achieving high-definition coloring of the 3D molded product 42.

While the diameter of the injection nozzles 35a to 35hc is about half that of the injection nozzles 36a to 36c in FIGS. 18A to 18C, it is to be understood that the present invention is not limited thereto but intended to cover nozzles of any diameter depending on the viscosity of ink and resin.

Further, the injection nozzles are arranged so that their axes (i.e., injection directions) are parallel to each other. The injection nozzle 36a in the nozzle head 35 first jets a molding resin, and then the injection nozzles for ink 35a to 35d jet inks in predetermined time sequence to color the resin on the stage 20. That is, the drive control unit 12 jets inks and resin in time sequence in accordance with the movement of the nozzle head 35 in the directions X and Y, thereby performing molding and coloring simultaneously in the molding process.

In the example of FIG. 18C, there is no injection nozzle for jetting a supporting part resin. Such a injection nozzle is unnecessary for a 3D object molding apparatus that does not support overhanging shape.

Another example is to configure the independently controllable nozzle head 35 so that the injection nozzles for ink 35a to 35d are arranged around the injection nozzle 36a for jetting a molding resin.

FIGS. 19A and 19B schematically show such a configuration. FIGS. 19A and 19B are schematic diagrams viewed from the side and from the above, respectively. As shown in FIG. 19B, the injection nozzles 35a to 35d are concentrically arranged around the injection nozzle 36a for jetting a molding resin, and as shown in FIG. 19A, their axes (injection directions) intersect with the axis of the injection nozzle 36a. Accordingly, the resin from the injection nozzles 36a can be colored with inks. This permits coloring in the molding process. In FIGS. 19A and 19B, the point of intersection of the axes of the injection nozzles 35a to 35d and the injection nozzle 36a is either in the surface of the stage 20 on which a molded product is to be formed or on top of a molded laminate previously formed on the stage 20.

Figure 20A:
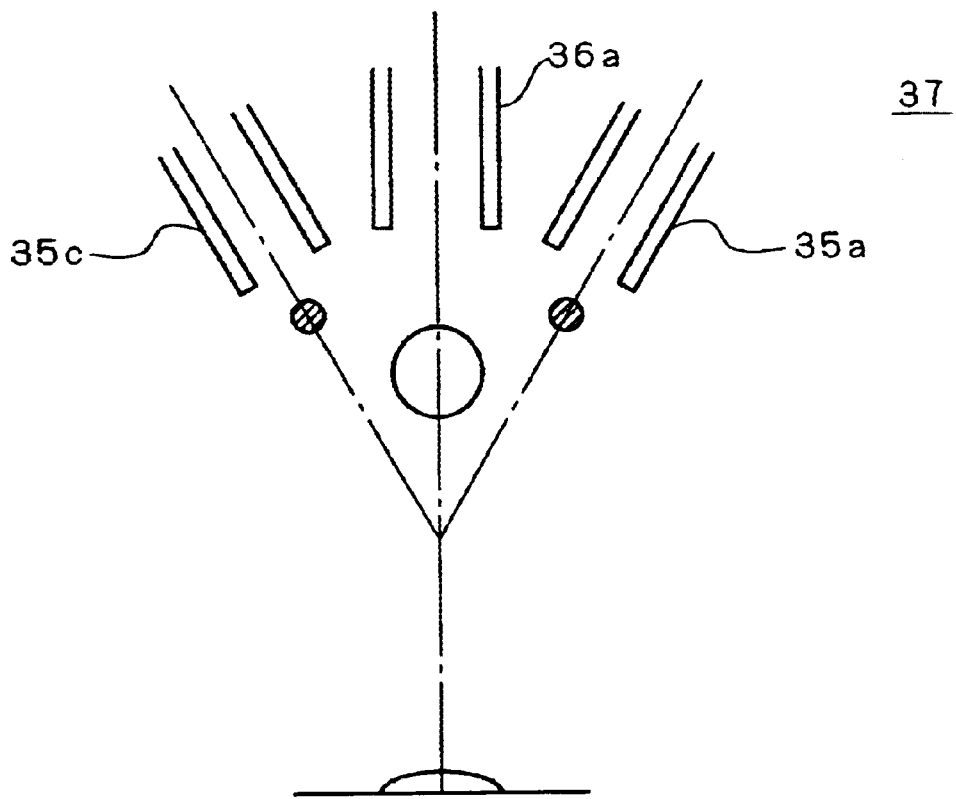
FIGS. 20A and 20B schematically show another configuration of a plurality of concentrically arranged injection nozzles according to the third and fourth preferred embodiments.
Figure 20B:
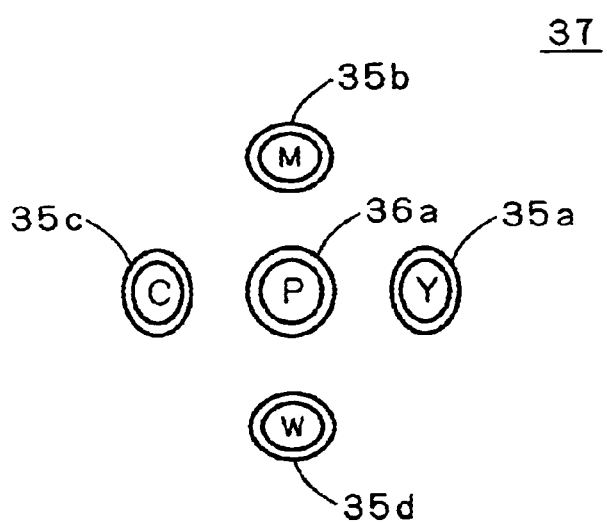

FIGS. 20A and 20B are minor modifications of the configuration of FIGS. 19A and 19B. FIGS. 20A and 20B are schematic diagrams viewed from the side and from the above, respectively. This configuration is similar to that of FIGS. 19A and 19B in that the injection nozzles 35a to 35d are concentrically arranged around the injection nozzle 36a for jetting a molding resin as shown in FIG. 20B and their axes intersect with the axis of the injection nozzle 36a as shown in FIG. 20A, but different in the point of intersection of the axes. In the configuration of FIGS. 20A and 20B, the point of intersection of the axes of the injection nozzles is defined as a point in a space between the injection nozzles, and the stage 20 or the layers formed on the stage 20. In other words, the molding resin from the injection nozzle 36a is colored with inks before it lands on the stage 20 or on the layers. The configuration in FIG. 20 eliminates the necessity to keep constant the space between the injection nozzles and the landing position of the resin.

In the configuration of FIGS. 19A and 19B, the point of intersection of the axes of the injection nozzles coincides with the landing position of the resin (i.e., molding position). Thus, the stage 20 must be lowered by one layer thickness as each layer is formed. In the configuration of FIGS. 20A and 20B, on the other hand, the resin from the injection nozzle 36a is colored with ink droplets adhering thereto during flying and then landed in a position to be molded. In this case, the landing position only has to be lower than the point of intersection of the axes of the injection nozzles; therefore, it becomes unnecessary to lower the stage 20 by one layer thickness as each layer is formed.

In either configuration of FIGS. 19A, 19B, 20A, and 20B, it is preferable that the injection nozzles for ink 35a to 35d are smaller in diameter than the injection nozzle for resin 36a, as above described. In such a configuration, ink droplets are smaller than resin droplets. This allows high-definition coloring of the 3D molded product 42.

Figure 21A:
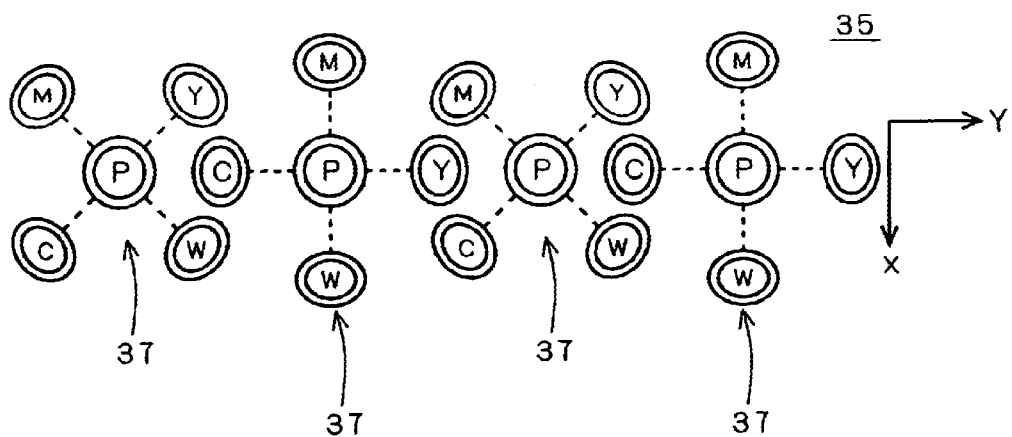
FIGS. 21A and 21B show another examples of the structure of the nozzle head according to the third and fourth preferred embodiments.
Figure 21B:
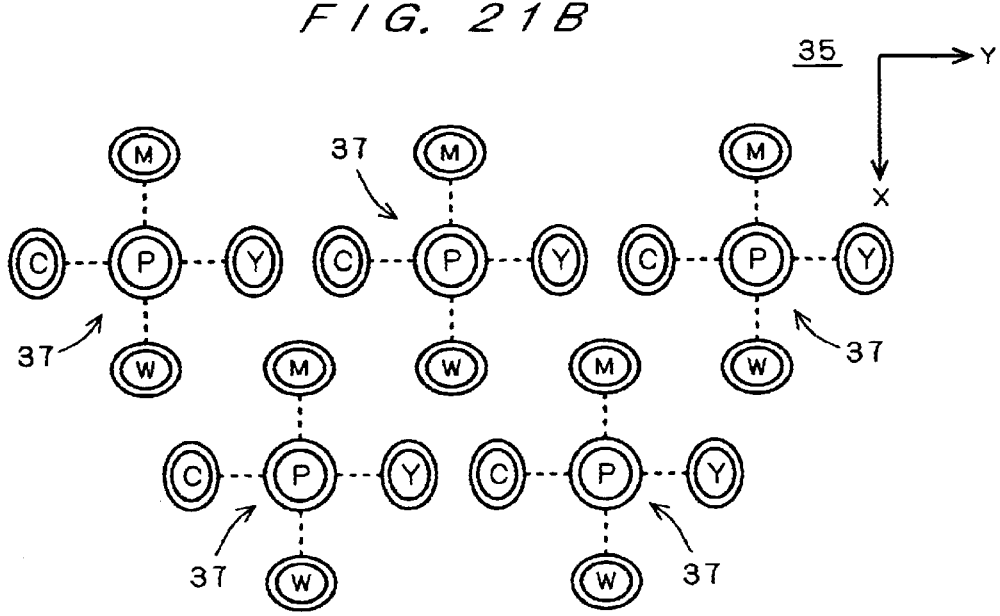

When a single nozzle unit 37 is comprised of the injection nozzles 35a to 35d and 36a as shown in FIGS. 19A, 19B, 20A, and 20B, arranging such nozzle units 37 as shown in FIGS. 21A and 21B allows effective and reliable color molding. FIG. 21A shows an example of the nozzle head 35 with such nozzle units arranged in a straight line in the direction Y, and FIG. 21B shows an example of the nozzle head 35 with such nozzle units 37 arranged in the XY plane. When a scan in the direction X using the nozzle head 35 in FIG. 21A leaves a gap in molding, the configuration of FIG. 21B should be adopted.

4. FOURTH PREFERRED EMBODIMENT

This preferred embodiment adopts a configuration similar to that of the second preferred embodiment described with reference to FIGS. 14 to 21. As materials for use in molding a 3D molded product, this preferred embodiment uses a molding resin to form the shape of the product and coloring inks to color the product. We will now describe the case where the molding resin is jetted from a predetermined molding nozzle and inks from predetermined coloring nozzles.

To produce a 3D molded product having a plurality of colors or any given combination color, a resin is jetted to mold a 3D molded product 42 and further inks having different color components are jetted into the portions requiring coloring. That is, this preferred embodiment uses inks of different color components as coloring agents applied to the 3D molded product. Further, an achromatic or uncolored resin is used as a molding resin of the 3D molded product since coloring is not specifically required.

In this preferred embodiment, as in the aforementioned embodiments, the tanks 40a to 40d hold yellow, magenta, cyan, and white inks, respectively, and the tank 38a holds an achromatic or uncolored resin for use in molding the 3D molded product 42.

The production of the 3D molded product is made by the 3D object molding apparatus 30 which operates according to the flow chart of FIG. 15 as in the third preferred embodiment.

First, an object to be molded is converted into a data format in step S1, and section data on each cross-section is produced by slicing the object in step S2. In step S3, the computer 11 transmits the information on one layer thickness in molding, to the drive control unit 12.

Then, the stage 20 is moved to a predetermined position in step S4 and the section data is converted by data converting means in step S5 to produce information on layer shape and color suitable for the size of droplets from the injection nozzles.

In step S60, according to the layer-shape and color information obtained by the above data conversion, the drive control unit 12 gives drive commands to the XY-directional driving unit 13, thereby to move the nozzle head 35 in a predetermined direction and causes the injection nozzles to jet inks or resins appropriately along with the movement of the nozzle head 35.

In molding the 3D molded product, a molding resin is jetted. Further, Y, M, C, and W inks are jetted into the portions requiring coloring according to the color information derived from the object to be molded. This is the coloring of the 3D molded product 42.

By using a resin to mold the product and jetting four color inks Y, M, C, W into the portions requiring coloring in this way, this preferred embodiment also allows coloring of the 3D molded product 42 in the molding process.

Of the injection nozzles 35a to 35d serving as the coloring nozzles, the nozzles 35a to 35c jet yellow, magenta, and cyan inks, respectively, which can represent different color components by subtractive color mixture, and the nozzle 35d jets a white ink. The injection nozzle 36a serving as a molding nozzle jets an uncolored resin for use in molding the 3D molded product 42.

The use of the uncolored resin from the injection nozzle 36a allows 3D molding of the 3D molded product 42, and sets of small ink droplets from the injection nozzles 35a to 35d allows representation of combination colors and gradations on the 3D molded product 42.

By using Y, M, and C inks as materials for use in molding the color portions of the 3D molded product 42 and a predetermined molding resin as a material for use in molding the 3D molded product 42, the 3D molded product can be colored in the molding process, corresponding to the object to be molded.

If any one of the molding resin or coloring inks has a white color component, clear reproduction of the color intensity and gradations on the product becomes possible as well as short-time low-cost coloring of the 3D molded product in the molding process.

That is, the use of a white ink facilitates clear reproduction of the color intensity and gradations on the 3D molded product 42. If the molding resin is a white resin, the necessity to include a white color component in inks can be eliminated. In this case, the structure of the nozzle head 35 can be simplified as compared with the case of using a white ink, while achieving the same effect as described above.

5. Characteristic Function and Effect

The aforementioned preferred embodiments give the 3D object molding apparatuses 10 and 30 for producing a 3D molded product of an object to be molded by jetting predetermined materials to form a layer corresponding to each cross-section, which is obtained by cutting the object at a plurality of parallel planes, and laminating such layers in succession on top of each other.

The 3D object molding apparatus comprises a first nozzle jetting a first material, a second nozzle jetting a second material, and control means which causes at least the first nozzle to jet the first material in molding the interior of each layer of the 3D molded product and at least the second nozzle to jet the second material in molding the surface of each layer of the product. That is, the second material is not strictly used only in the surface molding of the 3D molded product, and in the molding, coloring is somewhat offset to the interior side.

In the first preferred embodiment, the first material is an uncolored or white-colored resin for use in the interior molding, and the second material is a colored resin. In the third preferred embodiment, the first material is a molding resin and the second material is an ink.

The control means makes it possible to use these first and second materials properly in the surface and interior molding of the 3D molded product.

By using a plurality of colored resins having different color components as the second materials as in the first preferred embodiment, the surface of the 3D molded product can be colored in the molding process. The same applies to the case where a plurality of different color inks are used as the second materials as in the third preferred embodiment.

Further, representation of gradations is made possible by using a white resin as the first material, i.e., utilizing the white color of the resin. This avoids the necessity of preparing an additional material having a white color component, thereby allowing appropriate representation of the color intensity in coloring the surface of the 3D molded product.

Each of the 3D object molding apparatuses 10 and 30 comprises a molding nozzle jetting a molding resin to form the 3D molded product and coloring nozzles jetting coloring agents of a plurality of colors to color the product. In the second preferred embodiment, for example, the injection nozzle 15d in FIG. 1 corresponds to the molding nozzle and the injection nozzles 15a to 15c to the coloring nozzles. In the fourth preferred embodiment, the injection nozzle 36a in FIG. 14 corresponds to the molding nozzle and the injection nozzles 35a to 35d to the coloring nozzles. Such a configuration allows coloring of any desired part of the 3D molded product in the molding process, thereby achieving short-time low-cost coloring of the product.

By using colored resins having different color components as coloring agents, the apparatus can jet the colored resins into color portions of the 3D molded product and jet the molding resin into the other portions. This allows effective low-cost coloring of the 3D molded product in the molding process.

Further, by using inks having different color components as coloring agents, the apparatus can jet inks and a molding resin into color portions of the 3D molded product and jet only a molding resin into the other portions. This allows effective low-cost coloring of the 3D molded product in the molding process.

In either case, if the coloring nozzles are made smaller in diameter than the molding nozzle, ink droplets can be made smaller than resin droplets in the molding. This allows high-definition coloring of the 3D molded product.

Furthermore, a plurality of nozzle units, each comprised of the molding nozzle and the coloring nozzles arranged in a straight line, are aligned in a direction orthogonal to the straight line. Such a configuration allows each nozzle unit to perform molding simultaneously, thereby increasing molding efficiency of the 3D molded product.

The 3D object molding apparatuses 10 and 30 further comprise a supporting part nozzle jetting a supporting part resin to form overhang supporting parts to support the 3D molded product. This allows appropriate molding of the 3D molded product even if the product has complicated shape such as overhangs.

In 3D molding, further, the 3D object molding apparatuses 10 and 30 can jet both a white material and materials of a plurality of colors other than white, as a plurality of materials. This facilitates clear reproduction of the color intensity and gradations on the 3D molded product as well as allowing short-time low cost coloring of the product.

The second preferred embodiment shows the case where the white material and the materials of a plurality of colors other than white are both resins. In this case, the aforementioned plurality of materials correspond to a plurality of colored resins having different color components including a white resin. The use of such resins facilitates clear reproduction of the color intensity and gradations as well as allowing coloring of the product in the molding process.

If the plurality of colored resins other than white include a black resin, clear black can be reproduced on the 3D molded product.

If the plurality of colored resins other than white or other than white and black include yellow-, magenta-, and cyan-colored resins, any color component can be reproduced on the 3D molded product by mixture of the resins.

The fourth preferred embodiment shows the case where a molding resin and color inks are used as a white material and materials of a plurality of colors other than white, and any one of the molding resin and the color inks includes a white color. In this case, the 3D molded product is produced by separately jetting the molding resin and the plurality of color inks having different color components including white. This facilitates clear reproduction of the color intensity and gradations as well as allowing coloring of the 3D molded product in the molding process.

If the plurality of inks include a black ink, black can be clearly reproduce on the 3D molded product.

If the plurality of inks include yellow, magenta, and cyan inks, any color component can be reproduced on the 3D molded product by mixture of inks.

6. Modifications

It is to be understood that the present invention is not limited to the above detailed descriptions of the 3D object molding apparatus and method according to the preferred embodiments.

In the above examples, the nozzle heads 15, 35 move in the XY plane relative to the stage 20, and the movement in the direction X, i.e., in the direction of lamination, is made by moving up and down he stage 20 on which a 3D molded product is formed. However, the present invention is not limited thereto; in fact, the nozzle heads 15, 35 may be designed to be movable in the XYZ plane with the stage 20 placed in a fixed position. For high-precision, high-efficiency control over the positions of the nozzle heads 15, 35 relative to the stage 20, however, it is preferable to define the moving axes of the nozzle heads and the stage separately.

Figure 22:
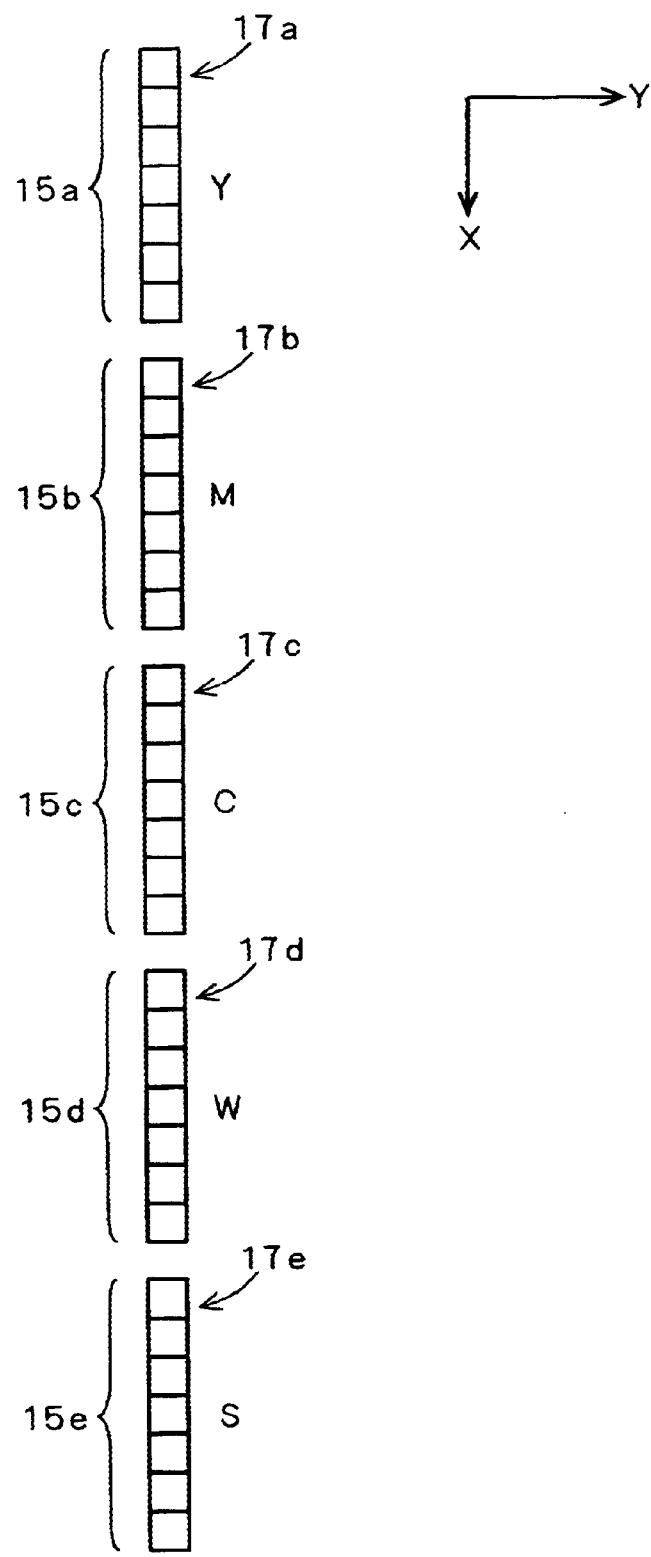
FIG. 22 shows a variation of the structure of the nozzle head in FIG. 9.
Figure 23:
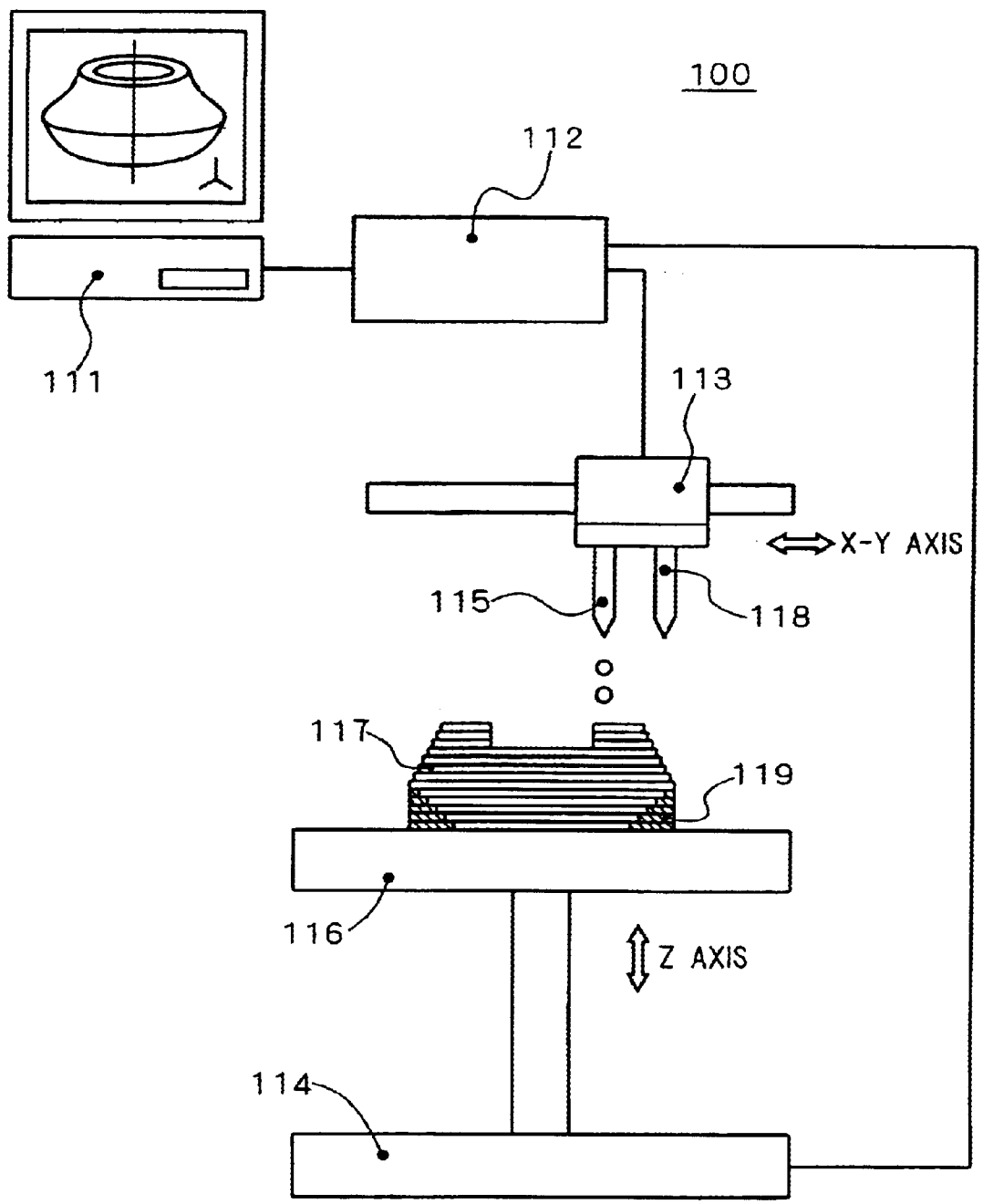
FIG. 23 is a schematic diagram of a conventional 3D object molding apparatus.

Also, the structures of the nozzle heads 15 and 35 are not limited to the above descriptions. For example, the nozzle head 15 in FIG. 9 may be configured as shown in FIG. 22. That is, a plurality of injection nozzles 15a to jet Y which are aligned in a straight line in the direction X form a nozzle array 17a. Similarly, nozzle arrays 17b to 17e are formed of a plurality of injection nozzles 15b to 15a to jet M, C, W, S, respectively, which are aligned in a straight line in the direction X. The nozzle arrays 17a to 17e are aligned in a longitudinal direction (i.e., direction X). In molding with such a configuration, for each line scan in the primary direction of scanning, each nozzle array is shifted by its longitudinal width in the secondary direction of scanning. Where the primary direction of scanning is the direction Y and the secondary direction of scanning is the direction X. In the configuration of FIG. 22, molding of a single line can be completed with five line scans in the primary direction of scanning.

When the stage 20 is moved (lowered) with molding of each layer as above described, it is preferable to measure the height of a previously formed layer by distance measuring means such as a photoelectric sensor and predict the height of the next layer to be formed so that the stage 20 can be moved to a position depending on the predicted height. This improves the accuracy in molding in the direction of layer thickness.

While the surface on which a molded product is to be formed is parallel to the XY plane (i.e., horizontal) in the above descriptions, it does not need to be horizontal.

In the above examples, colored materials are used as surface materials of the 3D molded product and an achromatic material as the interior material, but the present invention is not limited thereto. For example, colored materials may be used as interior materials and a transparent material as a surface material. In this case, a 3D molded product with its interior colored can be produced efficiently in the molding process.

Further, either of the first and second materials does not have to be a coloring material to color the 3D molded product. Since different materials can be used properly in the surface and interior molding of the 3D molded product, a protective film, for example, can be formed on the surface side. In this case, not a coloring material but a material to form the protective film is used.

While the invention has been shown and described in detail, the foregoing description is in all aspects illustrative and not restrictive. It is therefore understood that numerous modifications and variations can be devised without departing from the scope of the invention.

What is claimed is:

1. A three-dimensional object molding apparatus for producing a three-dimensional molded product of a three-dimensional object by jetting materials to form each of a plurality of layers and stacking each layer in succession, said apparatus comprising:

a first head for jetting a first material having an achromatic color;

a second head for jetting a second material having a chromatic color; and a controller for generating molding information on said layers based on input data regarding said three-dimensional object and for controlling said first head and said second head based on said molding information, said molding information including, for each of said layers, a first information on an interior part of said three-dimensional object and a second information on a surface part of said three-dimensional object, said controller controlling only said first head based on the first information and controlling at least said second head based on the second information thereby forming said three-dimensional molded product of which the interior part is made of a solid made of the first material and the surface part is made of a solid made of at least the second material.

2. The three-dimensional object molding apparatus as claimed in claim 1, wherein the second head is for further jetting a third material that has a different color than those of said first material and said second material.

3. The three-dimensional object molding apparatus as claimed in claim 2, wherein the second head is for further jetting a fourth material that has a different color than those of said first material, said second material, and said third material.

4. A three-dimensional object molding apparatus for producing a three-dimensional molded product of a three-dimensional object by jetting materials to form each of a plurality of layers and stacking each layer in succession, said apparatus comprising:

a first head for jetting a molding material having an achromatic color;

a second head for jetting a plurality of inks having different chromatic colors; and a controller for generating information on said layers based on input data regarding said three-dimensional object and for controlling said first head and said second head based on said information, said information including, for each of said layers, a first information on a sectional shape of said three-dimensional object and a second information on colors of a surface part of said three-dimensional object, said controller controlling said first head based on the first information and controlling said second head based on the second information thereby forming said three-dimensional molded product made of a solid made of the first material and a surface of which is colored by the inks.

5. The three-dimensional object molding apparatus as claimed in claim 4, wherein said first head and said second head have nozzles for jetting said molding material and said inks, respectively.

6. The three-dimensional object molding apparatus as claimed in claim 5, wherein each of said nozzles of the second head is smaller in scale than said nozzle of the first head.

7. The three-dimensional object molding apparatus as claimed in claim 5, wherein said first head and said second head are constituted as a unit in which said nozzles for jetting said molding material and said inks are aligned together in a common direction.

8. The three-dimensional object molding apparatus as claimed in claim 7, wherein a plurality of sets of units are provided in another common direction, orthogonal to the common direction in which said nozzles for jetting said molding material and said inks are aligned together.

9. A three-dimensional object molding apparatus for producing a three-dimensional molded product, that represents the shape of a three-dimensional object, by jetting materials to form each of a plurality of layers and stacking each layer in succession, said apparatus comprising:

a first head for jetting a molding material having an achromatic color;

a second head for jetting a plurality of coloring agents having different colors;

a third head for jetting a supporting material; and a controller for controlling said first head and said second head to form each layer of said three-dimensional molded product representing the shape of the three-dimensional object, and for controlling said third head to form a support for temporarily supporting said three-dimensional molded product during the production, wherein said coloring agents are molding resin having different chromatic colors, said controller generates molding information on said layers based on input data regarding said three-dimensional object and controls said first head and said second head based on said molding information, said molding information includes, for each of said layers, a first information on an interior part of said three-dimensional object and a second information on a surface part of said three-dimensional object, and said controller controls only said first head based on the first information and controls at least said second head based on the second information thereby forming said three-dimensional molded product of which the interior part is made of a solid made of the first material and the surface part is made of a solid made of at least the second material.

10. A three-dimensional object molding apparatus for producing a three-dimensional molded product, that represents the shape of a three-dimensional object, by jetting materials to form each of a plurality of layers and stacking each layer in succession, said apparatus comprising:

a first head for jetting a molding material having an achromatic color;

a second head for jetting a plurality of coloring agents having different colors;

a third head for jetting a supporting material; and a controller for controlling said first head and said second head to form each layer of said three-dimensional molded product representing the shape of the three-dimensional object, and for controlling said third head to form a support for temporarily supporting said three-dimensional molded product during the production, wherein said coloring agents are inks, said controller generates information on said layers based on input data regarding said three-dimensional object and controls said first head and said second head base on said information, said information includes, for each of said layers, a first information on a sectional shape of said three-dimensional object and a second information on colors of a surface part of said three-dimensional object, and said controller controls said first head based on the first information and controls said second head based on the second information thereby forming said three-dimensional molded product made of a solid made of the first material and a surface of which is colored by the inks.

* * * * *